(12) United States Patent
Kim et al.

(10) Patent No.: US 7,337,775 B2
(45) Date of Patent: Mar. 4, 2008

(54) CUTTING TIP FOR DIAMOND TOOL AND DIAMOND TOOL

(75) Inventors: Soo-Kwang Kim, Irvine, CA (US); Jong-Ho Kim, Seoul (KR); Hee-Dong Park, Suwon (KR)

(73) Assignee: Ehwa Diamond Industrial Co., Ltd. (KR)

( * ) Notice: Subject to any disclaimer, the term of this patent is extended or adjusted under 35 U.S.C. 154(b) by 0 days.

(21) Appl. No.: 10/503,799

(22) PCT Filed: Feb. 7, 2003

(86) PCT No.: PCT/KR03/00268

§ 371 (c)(1),
(2), (4) Date: Aug. 6, 2004

(87) PCT Pub. No.: WO03/066275

PCT Pub. Date: Aug. 14, 2003

(65) Prior Publication Data

US 2005/0103534 A1    May 19, 2005

(30) Foreign Application Priority Data

Feb. 8, 2002 (KR) .................. 10-2002-0007568

(51) Int. Cl.
*B28D 1/12* (2006.01)

(52) U.S. Cl. .................. 125/22; 125/13.01; 125/15; 451/542; 451/546; 451/547

(58) Field of Classification Search ............ 451/540, 451/541, 543, 546, 547, 542; 125/22, 13.01, 125/15
See application file for complete search history.

(56) References Cited

U.S. PATENT DOCUMENTS

| 4,041,650 | A | * | 8/1977 | Sawluk .................. 451/541 |
| 4,860,722 | A | | 8/1989 | Veglio |
| 4,930,487 | A | * | 6/1990 | Younger .................. 125/15 |
| 5,020,282 | A | * | 6/1991 | Okajima et al. .......... 451/541 |
| 5,123,217 | A | * | 6/1992 | Ishikawa et al. .......... 451/541 |
| 5,443,418 | A | * | 8/1995 | Frodin et al. ............ 451/540 |
| 5,997,597 | A | * | 12/1999 | Hagan .................. 51/309 |
| 6,033,295 | A | * | 3/2000 | Fisher et al. ............ 450/540 |
| 6,039,641 | A | * | 3/2000 | Sung .................. 451/540 |
| 6,159,286 | A | | 12/2000 | Sung |
| 6,626,167 | B2 | * | 9/2003 | Kim et al. .............. 125/15 |

FOREIGN PATENT DOCUMENTS

GB     1 039 422 A    8/1966

(Continued)

*Primary Examiner*—Eileen P. Morgan
(74) *Attorney, Agent, or Firm*—The Webb Law Firm, P.C.

(57) ABSTRACT

A cutting tip for a diamond tool and a diamond tool having the same which serve to cut or perforate various brittle materials such as stone, brick, concrete and asphalt. In particular, the cutting tip for a diamond tool and the diamond tool have diamond particles which are suitably arrayed to improve the cutting rate. A cutting tip for a diamond tool having diamond particles which are distributed in the cutting tip, wherein the diamond particles are inclined in respect to a cutting direction in a plane parallel to a cutting surface, and arrayed whereby grooved channels are formed successively overlapped on a brittle substance in cutting operation.

6 Claims, 26 Drawing Sheets

| | FOREIGN PATENT DOCUMENTS | | | WO | WO 99/39876 A1 | 8/1999 |
|---|---|---|---|---|---|---|
| JP | 56-114669 A | 9/1981 | | WO | WO 00/50202 A1 | 8/2000 |
| JP | 03-161278 A | 7/1991 | | | | |
| JP | 10-329042 A | 12/1998 | | * cited by examiner | | |

SYMMETRIC

SYMMETRIC

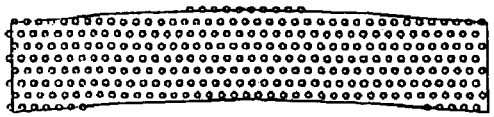
FIG. 18A
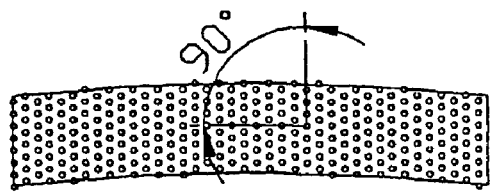
FIG. 18B
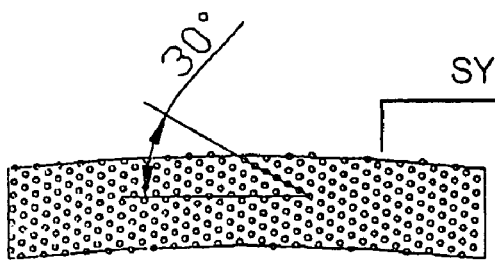
FIG. 18C
SYMMETRIC
FIG. 18D
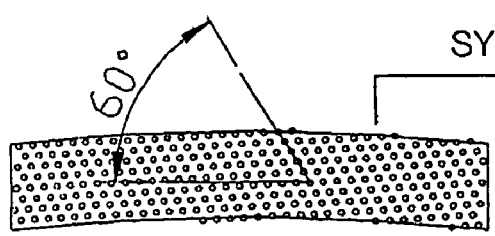
FIG. 18E
SYMMETRIC
FIG. 18F

CUTTING TIP FOR DIAMOND TOOL AND
DIAMOND TOOL

TECHNICAL FIELD

The present invention relates, in general, to a cutting tip for a diamond tool and a diamond tool typically used for cutting or drilling various brittle substances such as stones, bricks, concrete structures and asphalt structures. In particular, the cutting tip for a diamond tool and the diamond tool have diamond particles which are suitably arrayed to increase the cutting rate.

BACKGROUND ART

Artificial diamond invented in 1950s has been known to have the highest hardness among materials on the earth, so widely applied to cutting and grinding tools owing to such property.

In particular, artificial diamond (hereinafter will be referred to as "diamond") has been widely used in the stone processing field for cutting and grinding stones such as granite and marble and the construction field for cutting and grinding concrete structures.

A diamond tool generally has cutting tips, diamond particles which are distributed in the cutting tips and a steel core to which the cutting tips are fixed.

The cutting tips may include segment type and rim type tips.

FIG. 1 shows an example of a diamond tool having segment type tips.

As shown in FIG. 1, the segment type diamond tool includes a disk-shaped steel core 1, a number of cutting tips 2 and 3 fixed to the steel core 1 and a number of diamond particles randomly distributed in the cutting tips 2 and 3.

A method for fabricating the cutting tips where the diamond particles are randomly distributed generally utilizes powder metallurgy, by which the diamond particles 4 are mixed into metal powder and then sintered together with metal powder.

In such a fabrication method of the cutting tips via powder metallurgy, the diamond particles are not uniformly distributed among metal binder owing to differences in size and specific weight during mixing, forming and sintering of the fine diamond particles together with metal powder. Then, as shown in FIG. 1, a first cutting surface 5 has a too high particle density but a second cutting surface 6 has a too low particle density, thus arising the problem of random distribution of diamonds.

If the diamond particles are non-uniformly distributed in the cutting surfaces, the cutting rate of the cutting tip and the tool may be remarkably decreased.

SUMMARY OF THE INVENTION

In order to solve the foregoing problems of the prior art, the inventors have executed researches and experiments and came to propose the present invention based upon the researches and experiments. The invention has an object to provide a cutting tip for a diamond tool and a diamond tool having the same, which realizes excellent cutting rate by suitably arraying diamond particles.

BRIEF DESCRIPTION OF THE DRAWINGS

FIGS. 11A to 11C schematically illustrate examples of diamond arrays in sections taken perpendicular to a cutting surface of a cutting for a diamond tool in which diamond particles are arrayed on a slope in the cutting surface according to the invention, in which FIG. 11A is a diamond particle array having its basic unit in the shape of a square, FIG. 11B is a diamond particle array having its basic unit in the shape of a regular triangle, and FIG. 11C is a diamond particle array having its basic unit in the shape of an isosceles triangle;

FIGS. 18A to 18F schematically illustrate various types of cutting tips in which diamond particle arrays have their basic units in the shape of an isosceles triangle and inclined according to the invention;

DETAILED DESCRIPTION OF THE INVENTION

Figure 1:
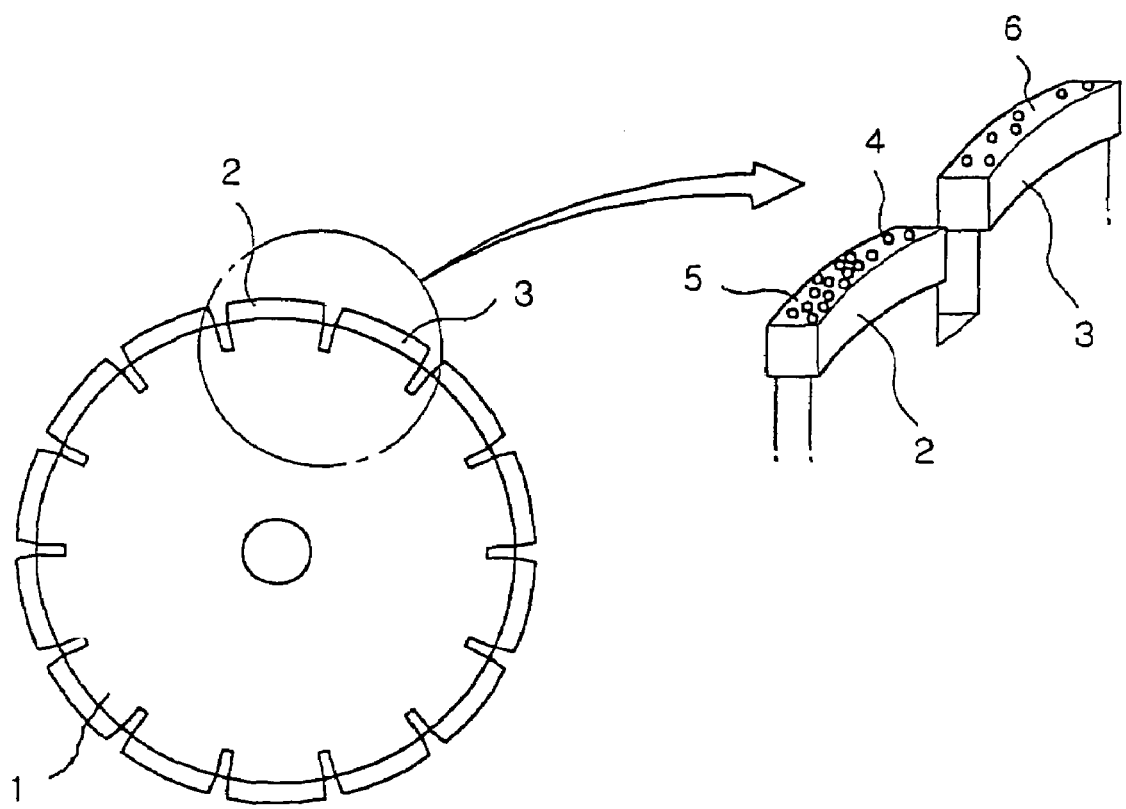
FIG. 1 illustrates a conventional diamond tool in which diamond particles are randomly distributed in cutting surfaces of cutting tips.

The present invention provides a cutting tip for a diamond tool having diamond particles which are distributed in the cutting tip, wherein the diamond particles are inclined in respect to a cutting direction in a plane parallel to a cutting surface, and arrayed whereby grooved channels are formed successively overlapped on a brittle substance in cutting operation.

The present invention also provides a cutting tip for a diamond tool having diamond particles which are distributed in the cutting tip, wherein the diamond particles are inclined in respect to a cutting direction in a plane parallel to a cutting surface, and arrayed whereby grooved channels are formed successively overlapped on a brittle substance in cutting operation, and wherein the diamond particles are inclined at a predetermined angle in respect to a line connecting upper vertices in a section or to a line connecting lower vertices in the section, which is taken perpendicular to the cutting surface, so that the diamond particles are inclined in the cutting surface.

Also, the present invention provides a diamond tool comprising: a number of cutting tips each having diamond particles which are inclined in respect to a cutting direction in a plane parallel to a cutting surface, and arrayed whereby grooved channels are formed successively overlapped on a brittle substance in cutting operation.

Further, the present invention provides a diamond tool comprising: a number of cutting tips having diamond particles which are inclined in respect to a cutting direction in a plane parallel to a cutting surface, and arrayed whereby grooved channels are formed successively overlapped on a brittle substance in cutting operation, and wherein the diamond particles are inclined at a predetermined angle in respect to a line connecting upper vertices in a section or to a line connecting lower vertices in the section, which is taken perpendicular to the cutting surface, so that the diamond particles are inclined in the cutting surface.

The following detailed description will disclose the invention.

The present invention is devised to suitably array diamond particles in a cutting surface of a cutting tip which contacts with a brittle substance to be cut so that the brittle substance can be cut even with a small force.

In order to cut or grind the brittle substance with a small force, the invention derives an idea from the effect of "shoveling", in which a worker shovels the ground next to a previously shoveled region so that even solid soil can be effectively shoveled with a small force.

That is, if the diamond particles are so arrayed in the cutting surface of the cutting tip that a following diamond particle can scratch the brittle substance just next to a grooved channel which is formed in the brittle substance by a preceding diamond particle, the brittle substance can be easily cut with a small force and thus the cutting rate of the diamond tool can be increased.

The present invention relates to a method of suitably arraying diamond particles in a cutting tip in order to obtain the above-described effect of shoveling.

In order to obtain the foregoing effect of shoveling, the present invention arrays diamond particles in a cutting tip, whereby the diamond particles are inclined in respect to a cutting direction in a plane parallel to a cutting surface, and whereby grooved channels are formed successively overlapped on a brittle substance in cutting operation.

Where the diamond particles are arrayed in the cutting tip according to the invention, effective cutting operation occurs, thereby improving cutting rate and thus maximizing the working performance.

Further, in order to maximize the above-described effect of shoveling, the invention preferably arrays the diamond particles in the above-described fashion while arraying the diamond particles at a predetermined angle in respect to a line connecting upper vertices in a section or to a line connecting lower vertices in the section, which is taken perpendicular to the cutting surface, so that the diamond particles are inclined in the cutting surface.

Hereinafter the detailed description will disclose a cutting operation which can realize the effect of shoveling in cutting the brittle substance with a diamond tool.

Figure 2:
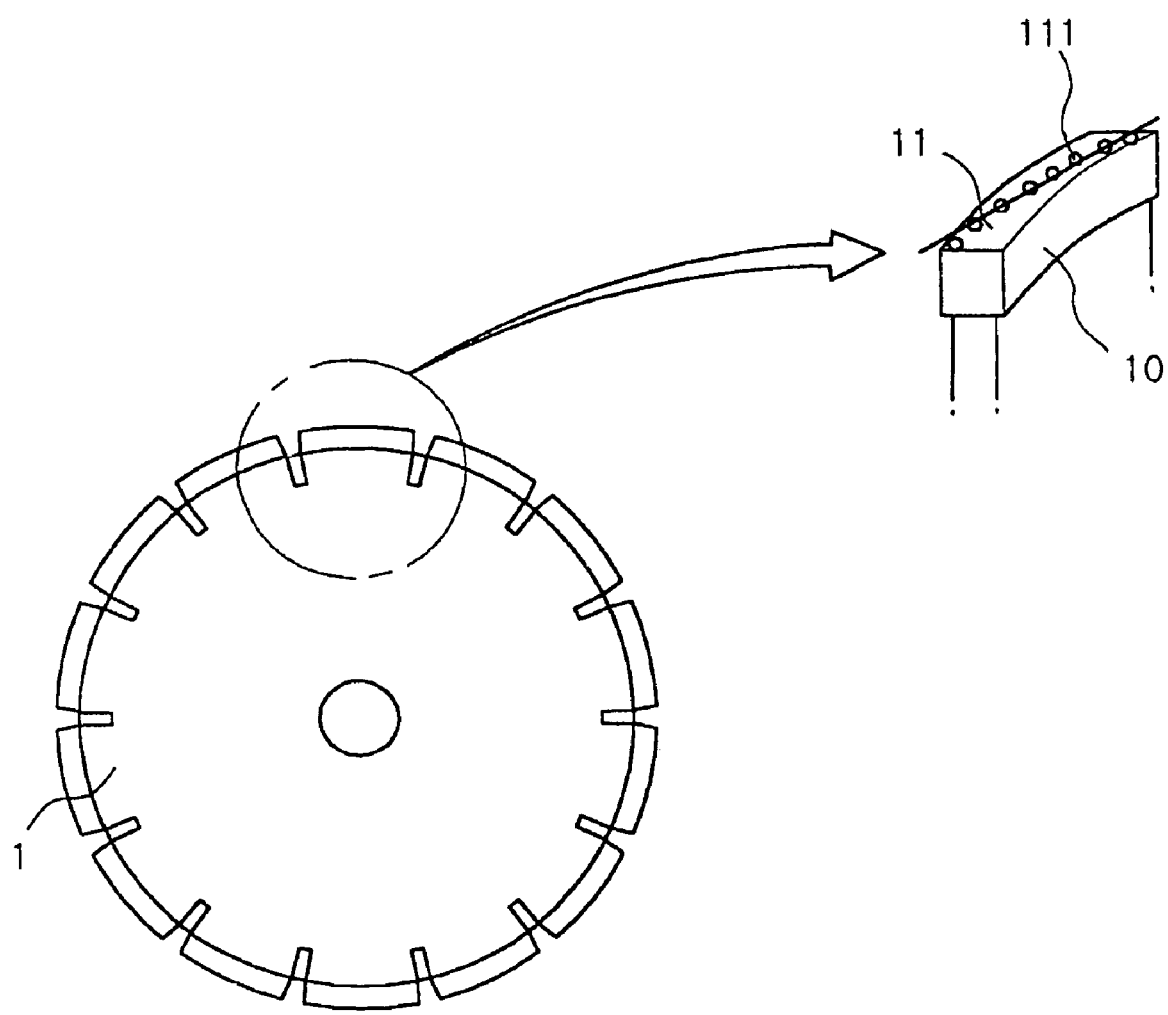
FIG. 2 illustrates a diamond tool of the invention in which diamond particles are arrayed along a slope in cutting surfaces.

FIG. 2 shows a diamond saw blade having segment type cutting tips, in which diamond particles are arrayed according to the invention.

As shown in FIG. 2, the diamond saw blade includes a steel core 1, a number of cutting tips 10 and a number of diamond particles 111 in cutting surfaces 11 of the cutting tips. In a pertinent one of the cutting surfaces 11, diamond particles 111 are regularly arrayed along a diagonal line of the pertinent cutting surface 11.

Figure 3:
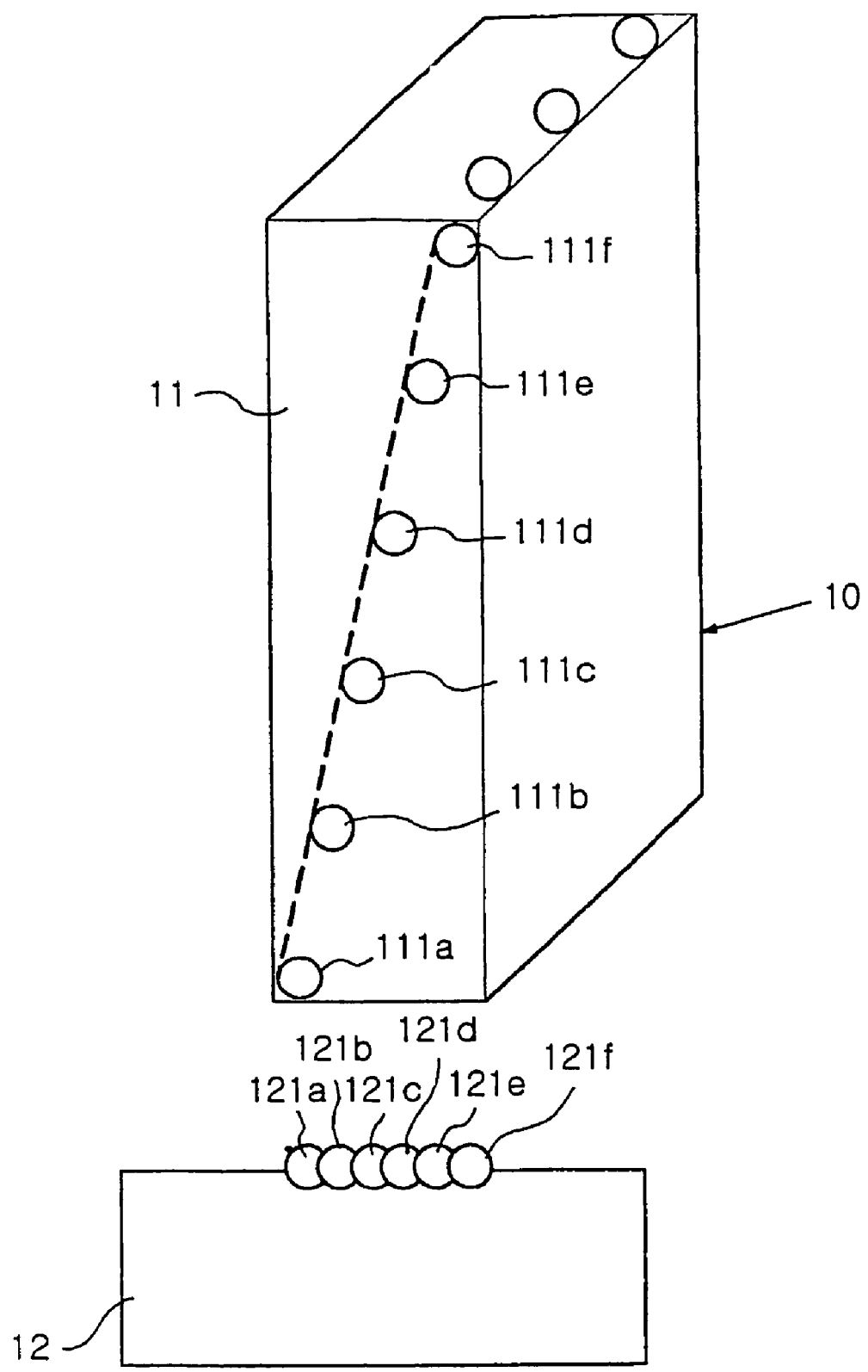
FIG. 3 schematically illustrates a cutting tip in which diamond particles are arrayed on a slope in a cutting surface and a brittle substance having channels grooved by the cutting tip according to an embodiment of the invention.

FIG. 3 shows the cutting tip 10 of FIG. 2 in detail and a brittle substance 12 having grooved channels which are formed by the cutting tip 10.

As shown in FIG. 3, diamond particles 111a to 111f are regularly arrayed along a slope, and when the brittle substance is cut out with the cutting tip of FIG. 2, the diamond particles 111a to 111f successively form grooved channels 121a to 121f in the brittle substance 12.

That is, after a preceding diamond particle 111a forms a first grooved channel 121a in the brittle substance, a first following diamond particle 111b forms a second grooved channel 121b just next to the grooved channel 121a, and a second following diamond particle 111c forms a third grooved channel 121c just next to the grooved channel 121b.

Where the diamond particles 111a to 111f are regularly arrayed along the slope in the cutting tip according to the invention, the cutting tip can cut the brittle substance 12 successively forming the grooved channels 121a to 121f in the brittle substance 12 as shown in FIG. 3. As a result, the cutting operation can be effectively carried out.

Figure 4:
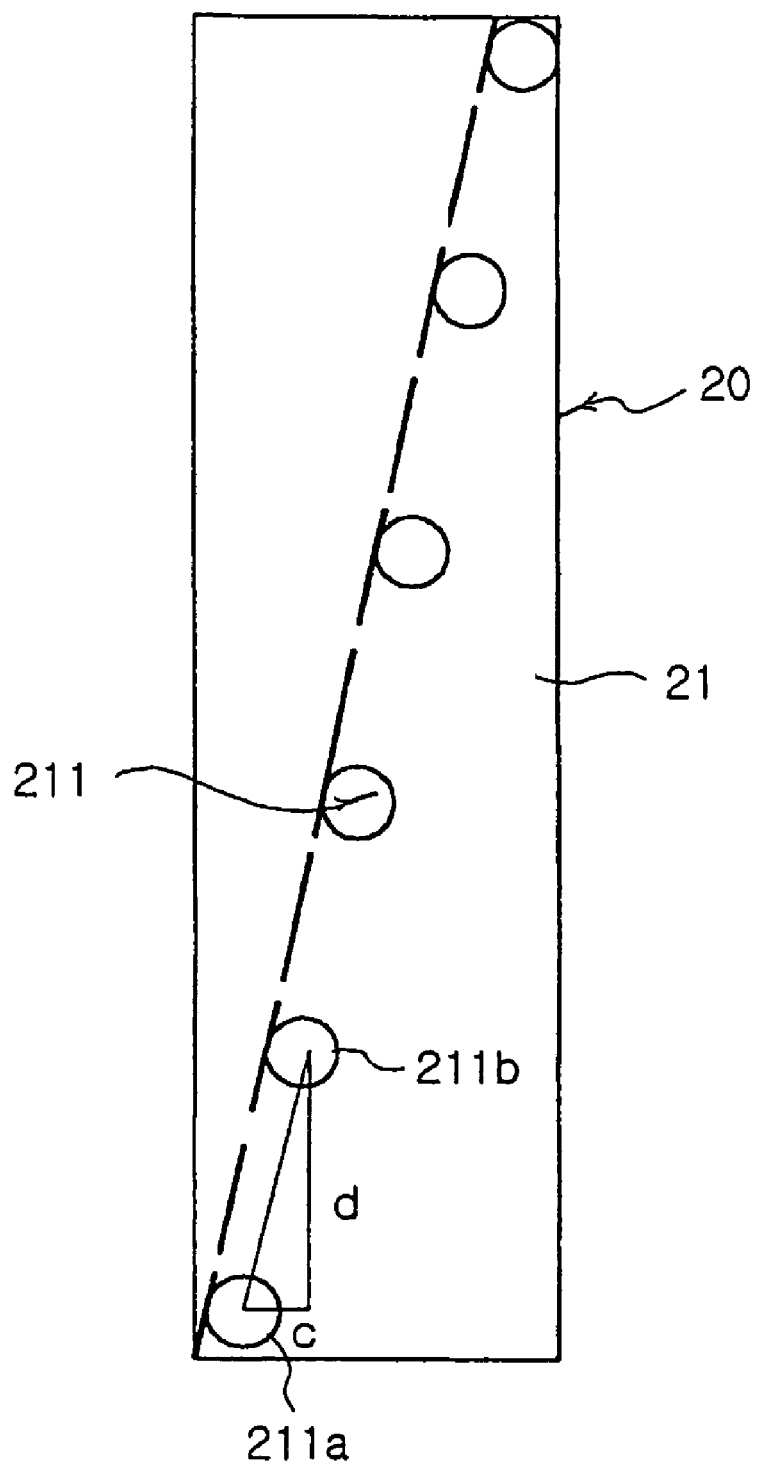
FIG. 4 schematically illustrates a cutting surface of a cutting tip for a diamond tool in which diamond particles are arrayed on a slope according to the invention.

FIG. 4 schematically shows positions of diamond particles exposed in a cutting surface in which the diamond particles are arrayed at an angle of inclination.

In FIG. 4, the inclined array in the cutting surface has a basic configuration that the diamond particles are arrayed along the longest diagonal (arrayed along the slope in FIG. 4), and two adjacent diamond particles 211a and 211b have an x-axial inter-center distance c and a y-axial inter-center distance d. The effect of shoveling is observed if c is smaller than or equal to a diameter D of the particles. On the other hand, if c is larger than the diameter D of the particles, the effect of shoveling cannot be expected since two adjacent ones of the diamond particles 211 are not overlapped.

Further, since diamond particles exposed in cutting surfaces are randomly spaced from one another, as shown in FIG. 14, grooved channels may not be overlapped or the effect of shoveling may not be obtained even if c is theoretically smaller than the diameter D of the particles.

Figure 5:
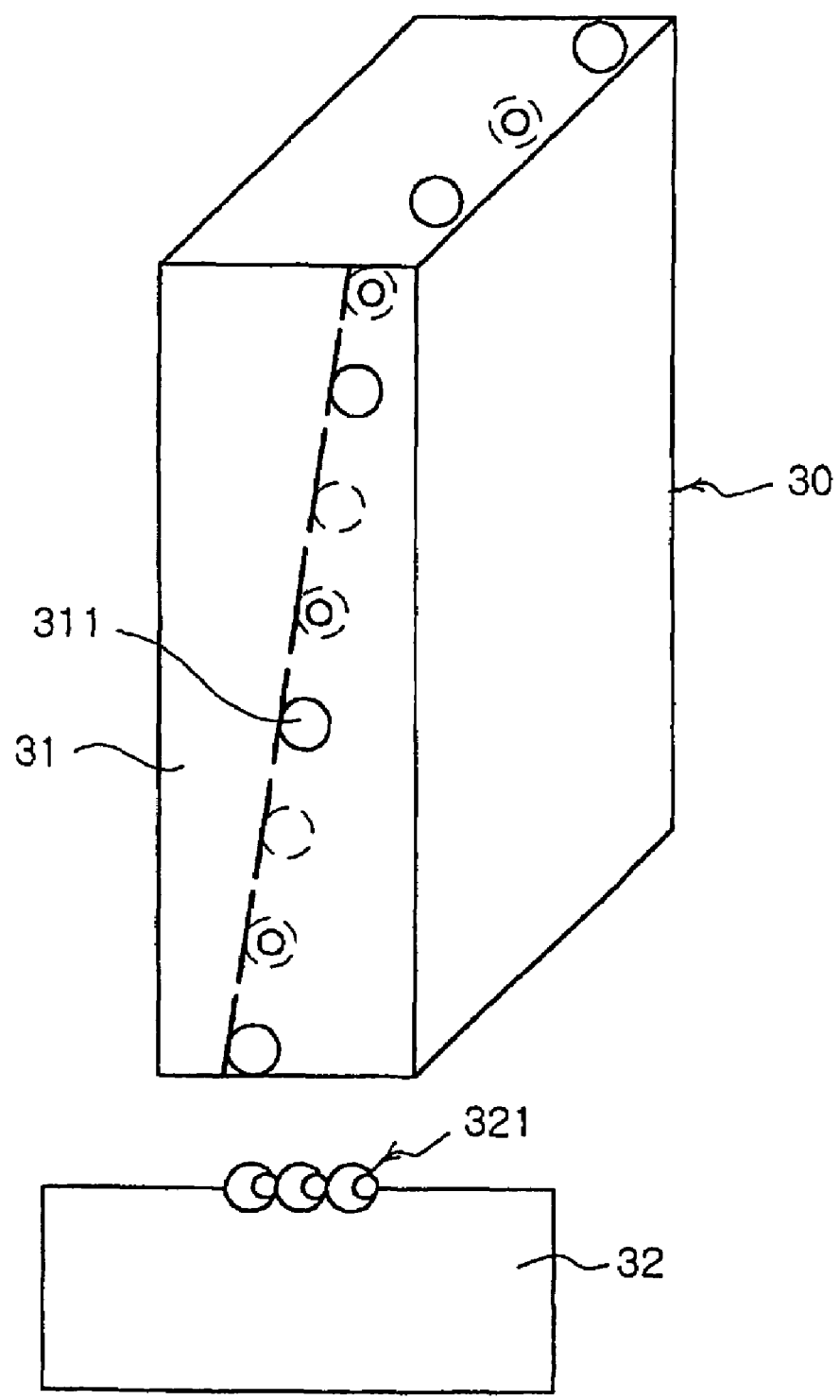
FIG. 5 schematically illustrates a cutting tip in which diamond particles are arrayed on a slope in a cutting surface and a brittle substance having channels grooved by the cutting tip according to an alternative embodiment of the invention.
Figure 6:
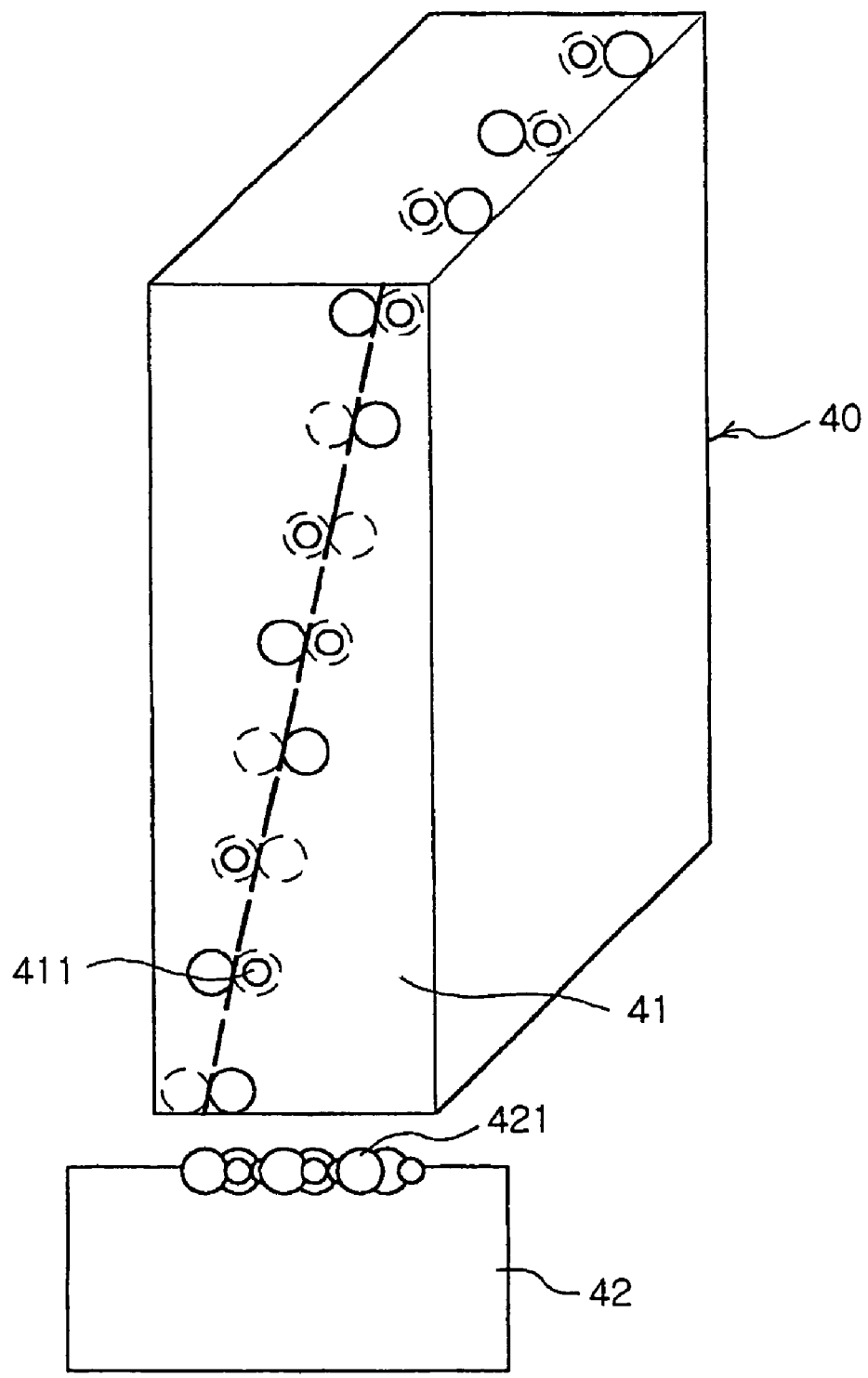
FIG. 6 schematically illustrates a cutting tip in which diamond particles are arrayed on a slope in a cutting surface and a brittle substance having channels grooved by the cutting tip according to another alternative embodiment of the invention.

Therefore, as shown in FIG. 5, the gradient (slope) of the diamond particles 311 diagonally arrayed along a line in a cutting surface 31 of a cutting tip 30 is increased over those in FIGS. 3 and 4 so that c becomes smaller than D to increase the overlapped degree of grooved channels formed by adjacent diamond particles. Alternatively, as shown in FIG. 6, pairs of diamond particles 411 are arrayed on a slope in a cutting surface 41 of a cutting tip to further ensure that adjacent diamond particles be overlapped with each other. In this fashion, grooved channels 321 and 421 are more reliably overlapped, respectively, in brittle substances 32 and 42, thereby maximizing the effect of shoveling.

Figure 7:
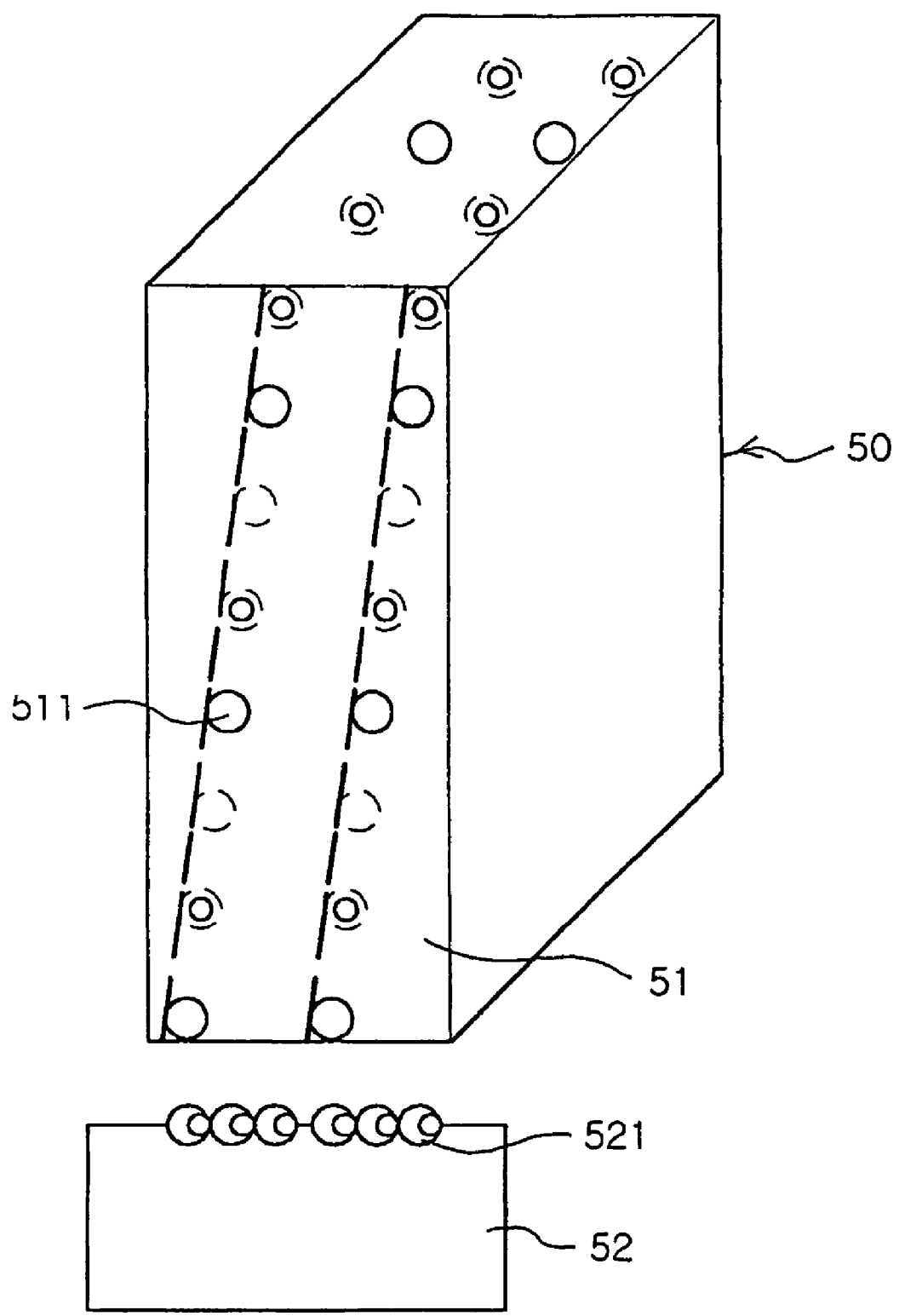
FIG. 7 schematically illustrates a cutting tip in which diamond particles are arrayed on slopes in a cutting surface and a brittle substance having channels grooved by the cutting tip according to further another alternative embodiment of the invention.
Figure 8:
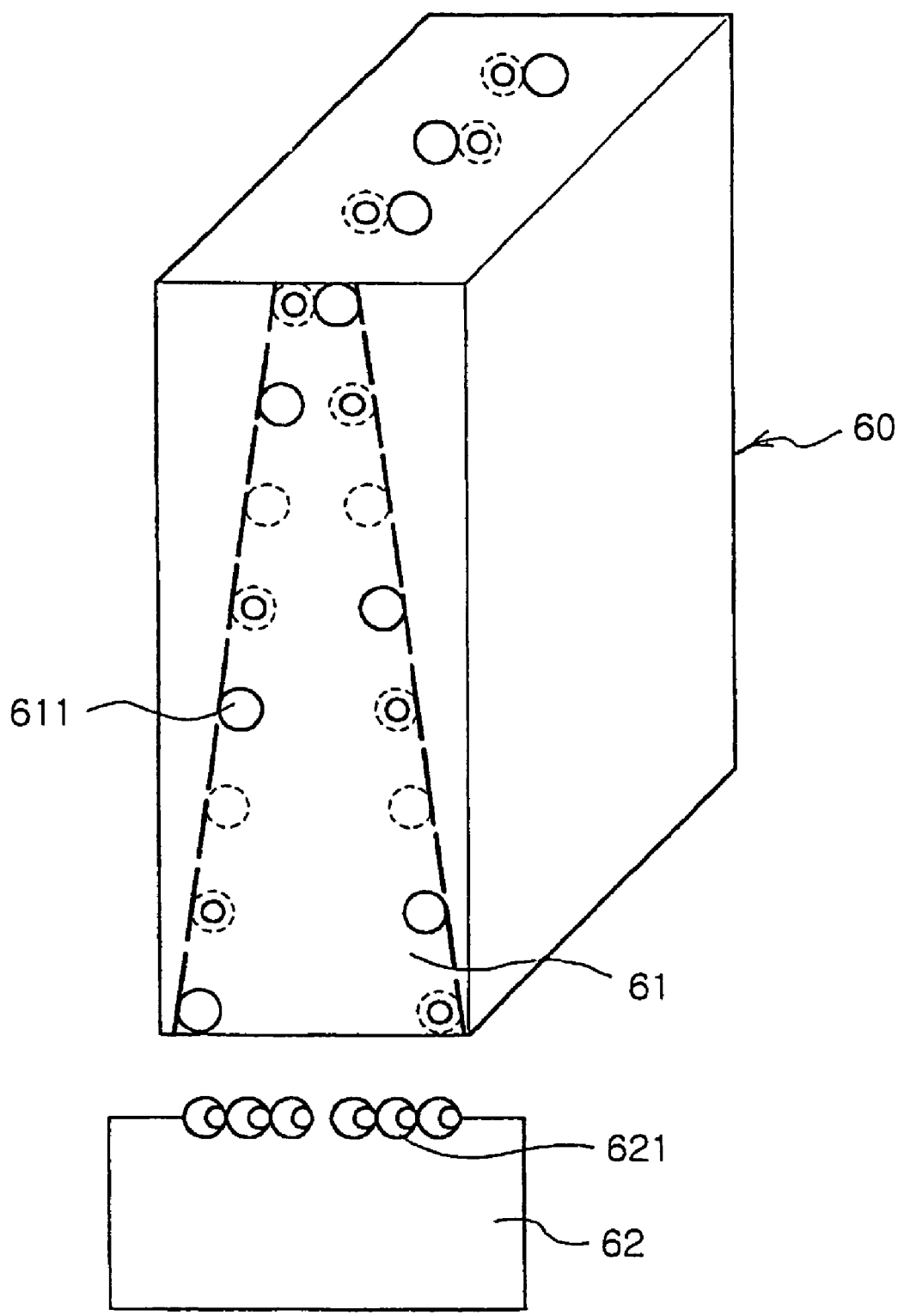
FIG. 8 schematically illustrates a cutting tip in which diamond particles are arrayed on slopes in a cutting surface and a brittle substance having channels grooved by the cutting tip according to still another alternative embodiment of the invention.

Further, if a cutting tip (segment) has a relatively large value in thickness or diamond particles are highly dense, the invention may array diamond particles 511 on at least two parallel lines in a cutting surface 51 of a cutting tip 50 as shown in FIG. 7, or diamond particles 611 on at least two non-parallel lines in a cutting surface 61 of a cutting tip 60 as shown in FIG. 8. In this fashion, the invention ensures that grooved channels 521 and 621 can be more reliably overlapped, respectively, in brittle substances 52 and 62.

Figure 9:
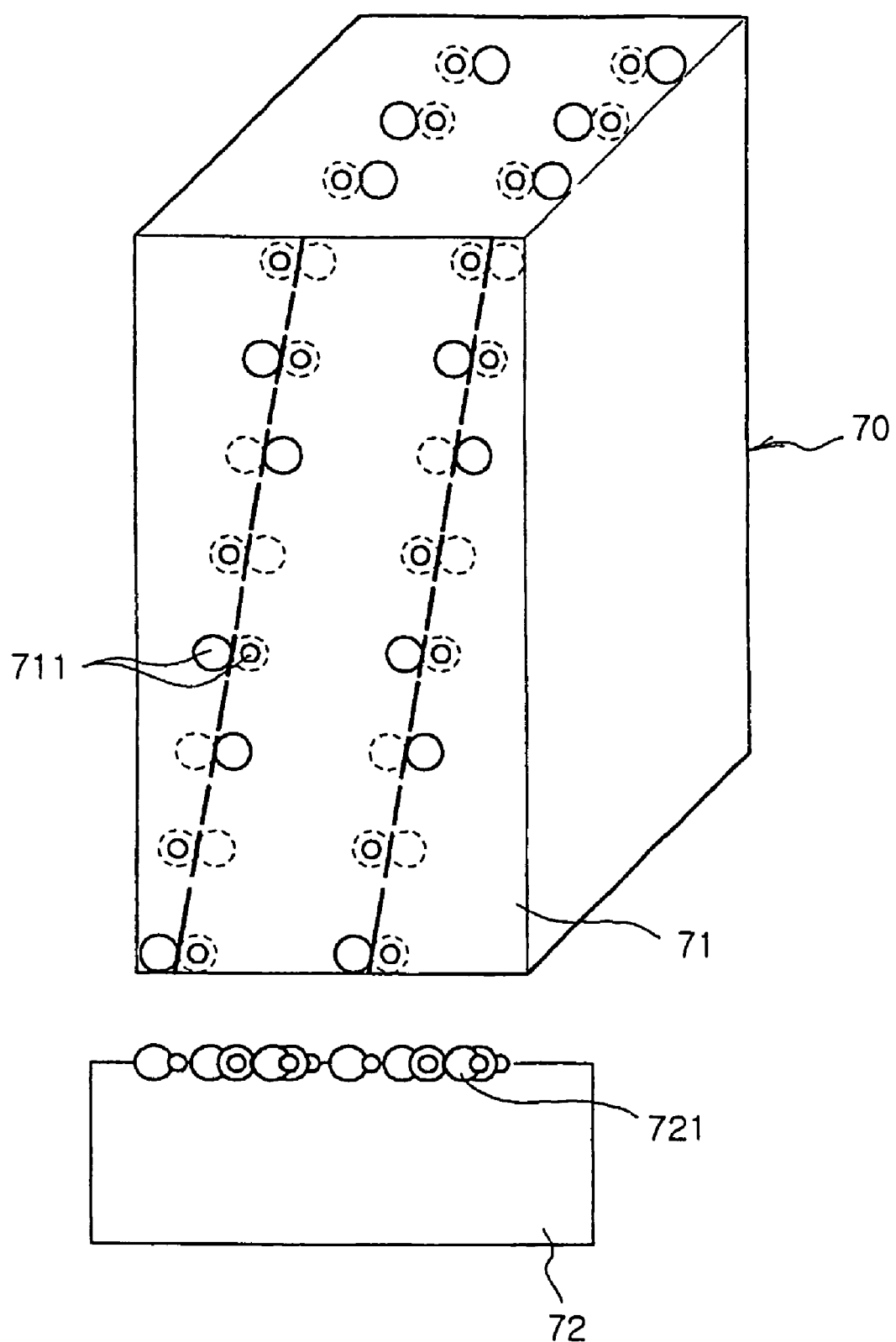
FIG. 9 schematically illustrates a cutting tip in which diamond particles are arrayed on slopes in a cutting surface and a brittle substance having channels grooved by the cutting tip according to further another alternative embodiment of the invention.
Figure 10:
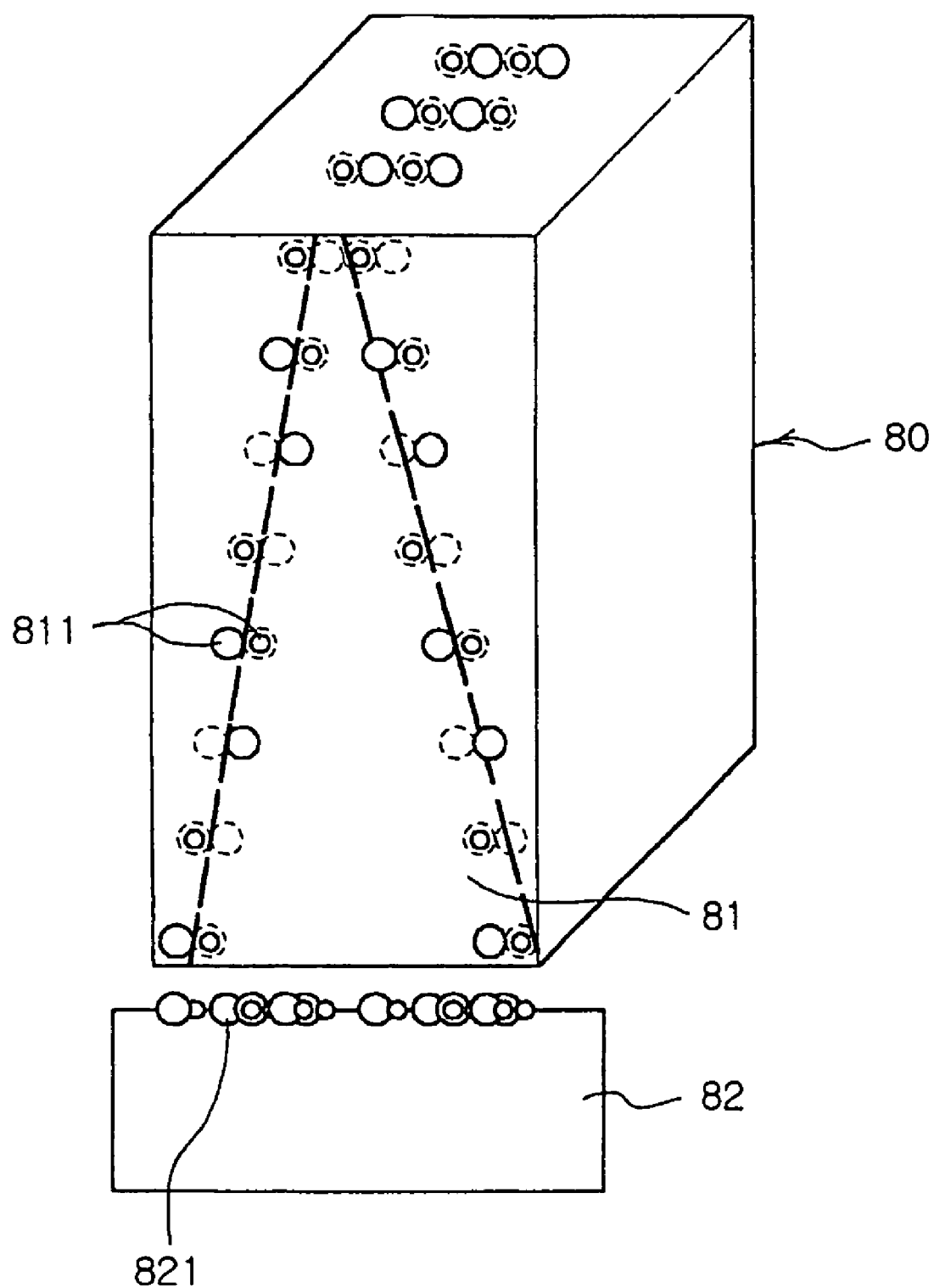
FIG. 10 schematically illustrates a cutting tip in which diamond particles are arrayed on slopes in a cutting surface and a brittle substance having channels grooved by the cutting tip according to still another alternative embodiment of the invention.

Also as shown in FIGS. 9 and 10, the invention arrays pairs of diamond particles 711 and 811, respectively, on two lines in cutting surfaces 71 and 81 of cutting tips 70 and 80 so as to more reliably ensure overlapping of grooved channels 721 and 821 in brittle substances 72 and 82, thereby maximizing the effect of shoveling.

In order to maximize the effect of shoveling, it is important to locate the diamond particles in the cutting surfaces of the cutting tips.

It is needed to properly set the distance of diamond particles based upon the size of diamond particles.

Hereinafter description will be made about more preferred cutting tips for diamond tools and diamond tools having the same which can maximize the effect of shoveling according to the invention.

Fabrication methods of a cutting tip for a diamond tool of the invention may include powder metallurgy, by which diamond particles are mixed into metal powder and then sintered together with metal powder.

Figure 11A:
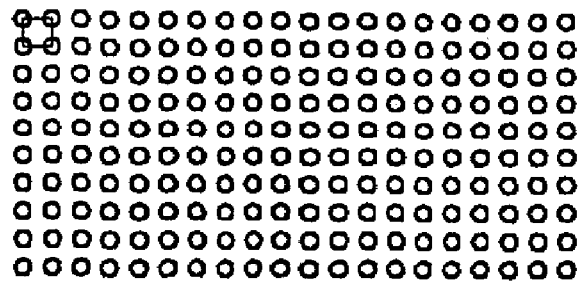
Figure 11B:
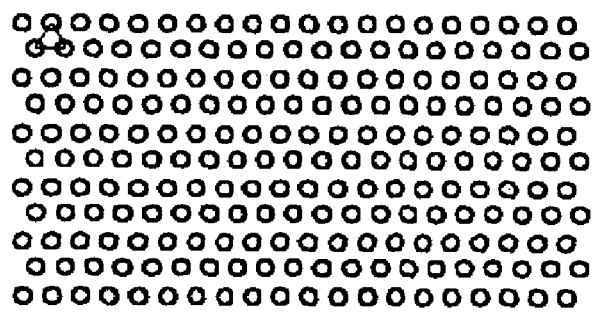
Figure 11C:
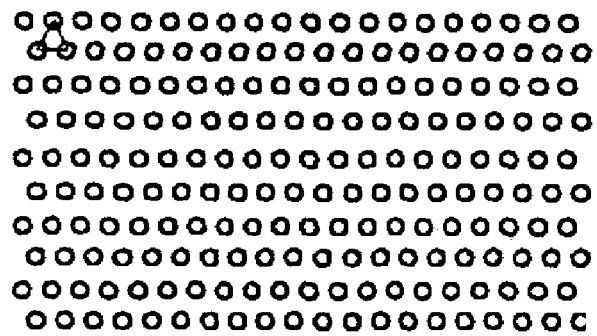

In formation of metal powder for the purpose of cutting tip fabrication via powder metallurgy, the diamond particles are arrayed in a layered structure within the cutting tip, in which examples of arrayed diamond particles are shown in FIGS. 11A to 11C.

As shown in FIGS. 11A to 11C, the diamond particles may be arrayed according to their basic units such as square (FIG. 11A), regular triangle (FIG. 11B), isosceles triangle (FIG. 11C).

Figure 12:
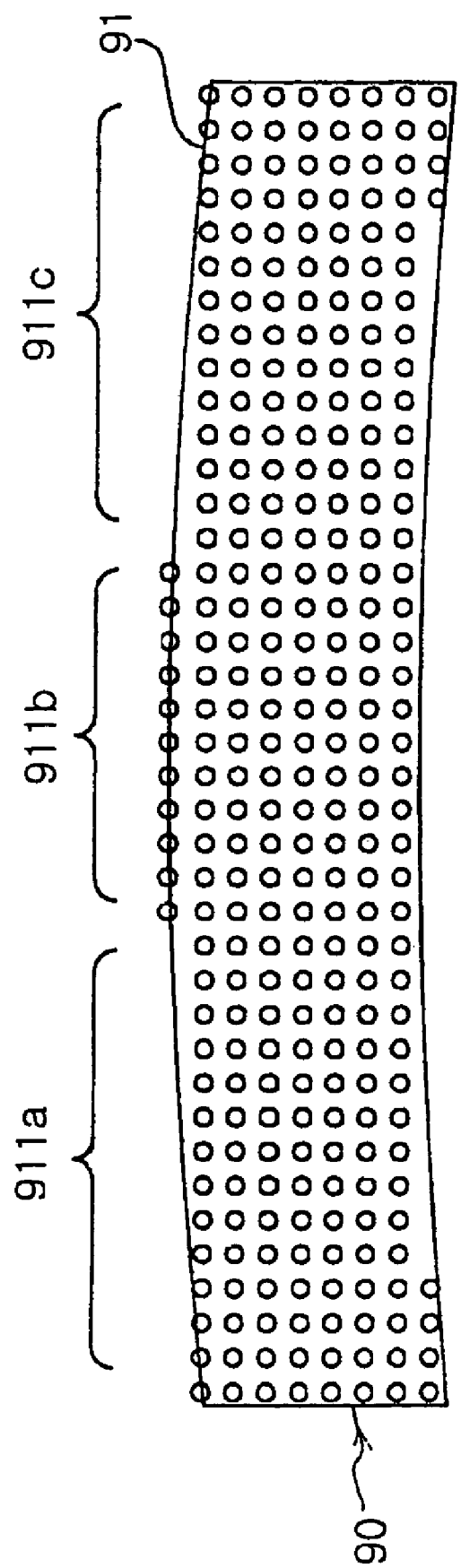
FIG. 12 schematically illustrates a cutting tip for a diamond tool having a diamond particle array in the basic shape of a square as in FIG. 11A.

Of course, the basic unit of arraying the diamond particles is not restricted to the above configurations.

Where the diamond particles are arrayed to form a basic unit of regular triangle as shown in FIG. 11A, the diamond particles are arrayed within the cutting tip as shown in FIG. 12.

Figure 13:
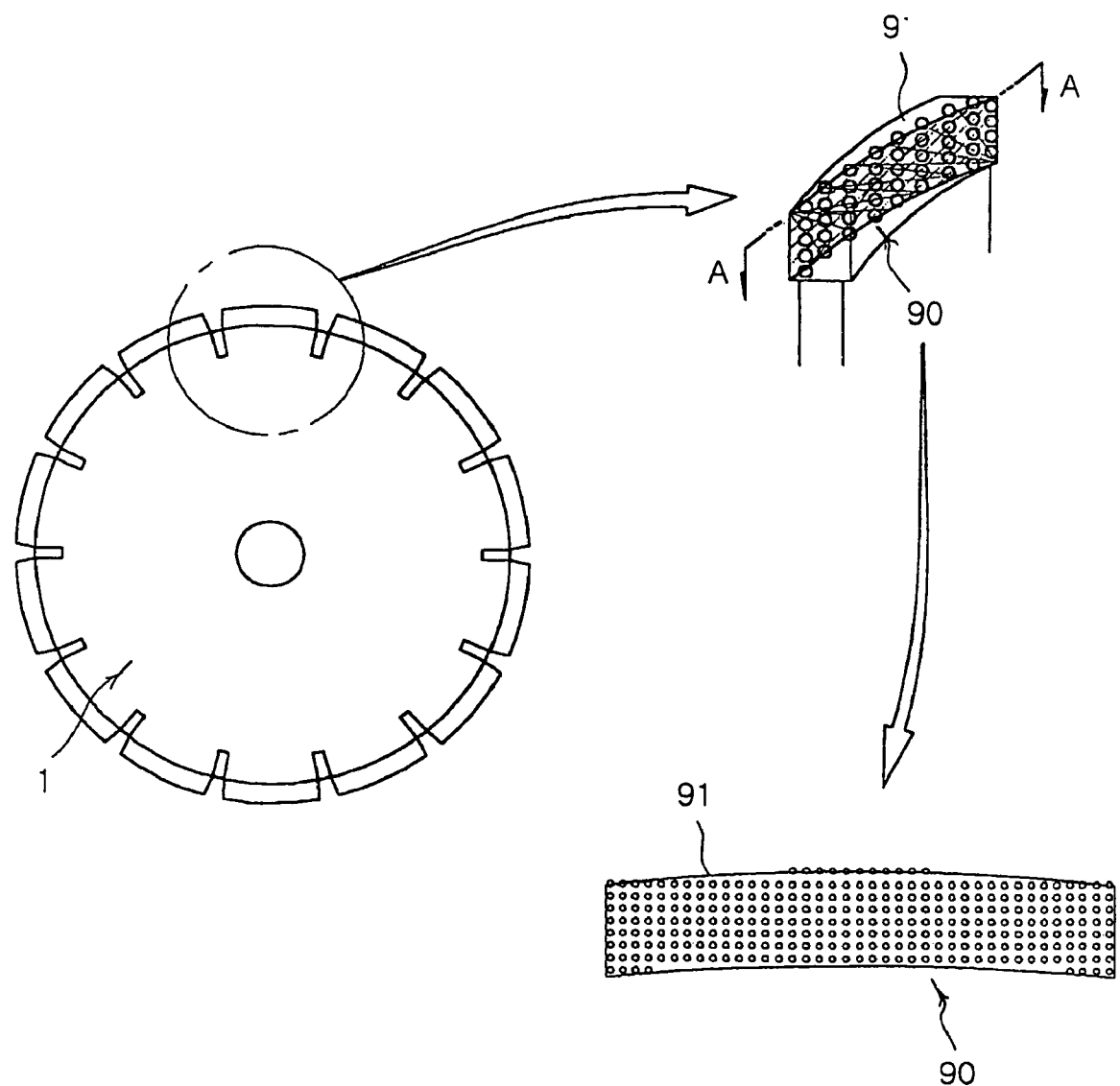
FIG. 13 schematically illustrates a section of a cutting tip for a diamond tool taken perpendicular to a cutting surface in which diamond particles are arrayed on a slope in the cutting surface according to the invention.

The array shown in FIG. 12 is taken along a line A-A of the cutting tip in FIG. 13.

The term used herein, that is, "a section taken perpendicular to the cutting surface so that diamond particles are arrayed on a slope in the cutting surface" means a section taken by cutting the cutting tip along the line A-A as shown in FIG. 13.

In FIG. 12, the diamond particles in the cutting surface 91 of the cutting tip 90 which performs cutting can be seen. Diamond particles 911b in a central portion participate in cutting in an early stage, but after pulling out of these diamond particles 911b, diamond particles 911a and 911c in lateral portions participate in cutting.

As the above procedures repeatedly occur in the cutting operation, the diamond particles may not uniformly protrude from across the cutting surface of the cutting tip but be dense in some areas. Then, the effect of shoveling cannot be expected for 100%.

Therefore, it is effective to array the diamond particles at a predetermined angle of inclination.

That is, it is preferable in the invention that the diamond particles are arrayed at a predetermined angle of inclination (hereinafter will be referred to as "inclination angle") in respect to a line connecting upper vertices or a line connecting lower vertices in a section taken perpendicular to the cutting surface.

FIGS. 14A to 14F show several arrays of diamond particles according to their angles of inclination with a square as a basic unit.

Figure 14A:
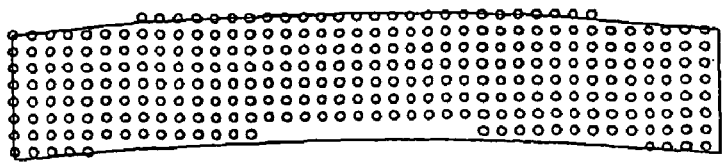
FIGS. 14A to 14F schematically illustrate various types of cutting tips in which diamond particle arrays have their basic units in the shape of a square and inclined according to the invention.
Figure 14B:
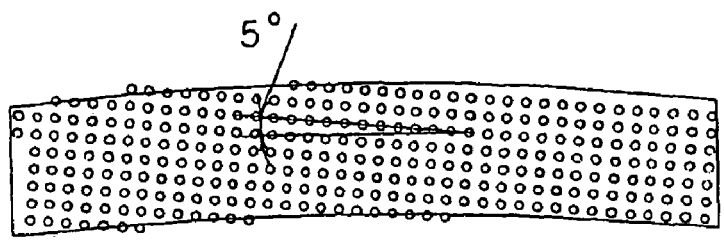
Figure 14C:
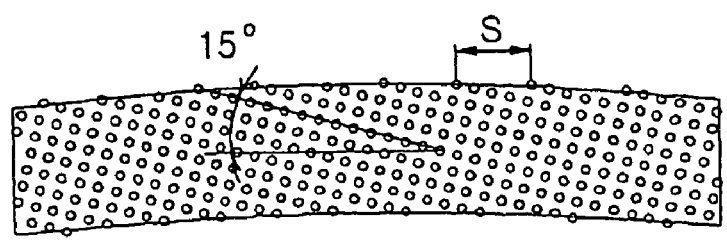
Figure 14D:
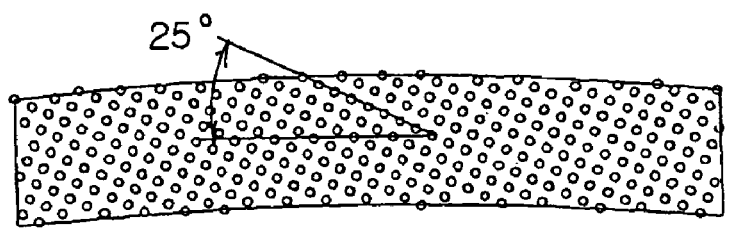
Figure 14E:
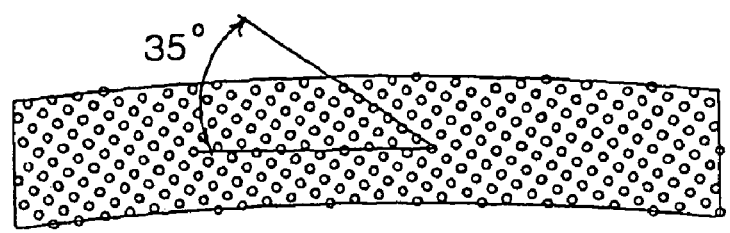
Figure 14F:
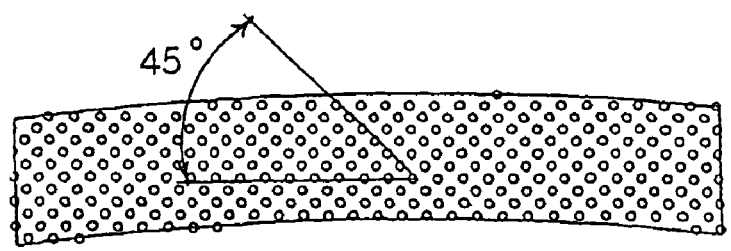

It can be seen from FIGS. 14A to 14F that those arrays in FIGS. 14B to 14F maintain proper distances S compared with that of the array in FIG. 14A.

Figure 15:
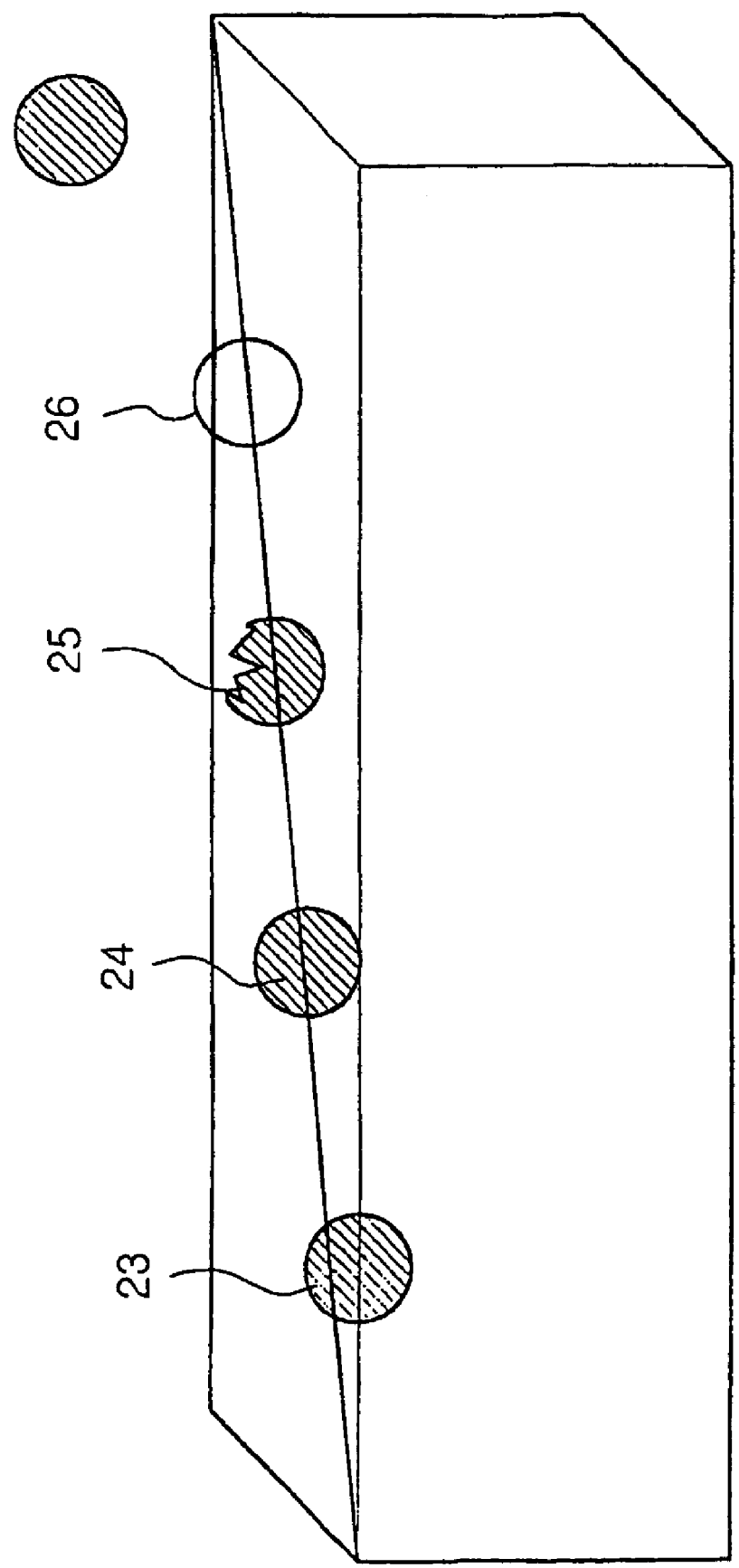
FIG. 15 illustrates several diamond particles arrayed in a cutting surface of a cutting tip in a cutting operation.

Generally, in case of a diamond saw blade, diamond particles are arrayed in various types such as an emerging crystal 23, a whole crystal 24, a fractured crystal 25 and a pull-out crystal 26 as shown in FIG. 15.

According to a document related to diamond tools, the cutting operation is most efficiently carried out when the ratio among whole crystal, fractured crystal and pull-out crystal is 4:4:2.

Therefore, if the diamond particles of the cutting tip are arrayed preferably at a predetermined inclination angle, more preferably at 5 deg or more, the association of whole crystals, fractured crystals and pull-out crystals can be made more suitably. This allows the cutting operation to be carried out more effectively.

Where the diamond particles are arrayed based upon a square shown in FIGS. 14A to 14F as their basic unit, the diamond particles are symmetrically arrayed in reference to an inclination angle of 45 deg.

Figures 16A, 16B:
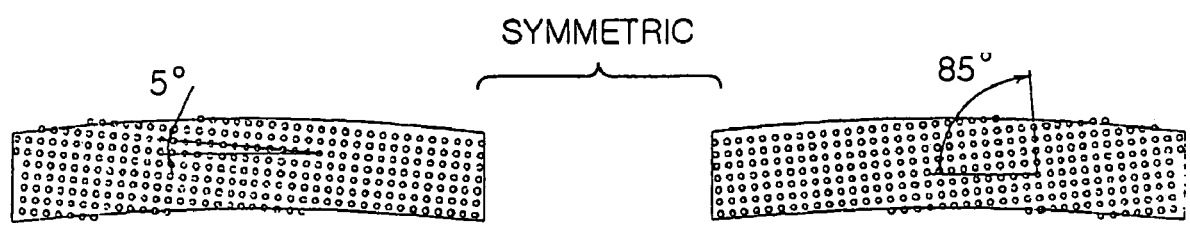
FIGS. 16A to 16D schematically illustrate a symmetric array of diamond particles having inclination angles of 5 and 25 deg having their basic units in the shape of a square.
Figures 16C, 16D:
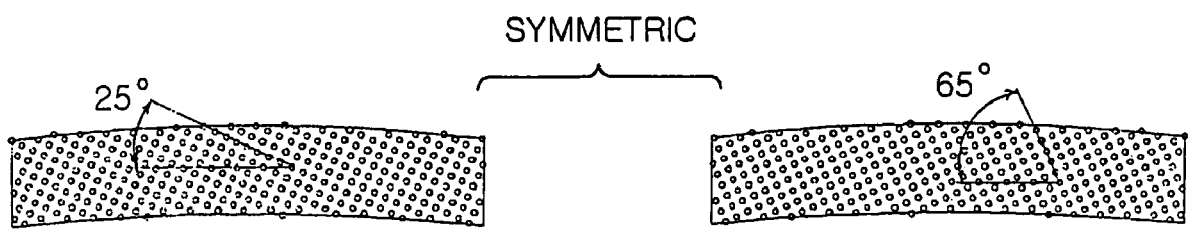
Figure 17A:
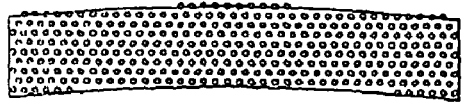
FIGS. 17A to 17F schematically illustrate various types of cutting tips in which diamond particle arrays have their basic units in the shape of a regular triangle and inclined according to the invention.
Figure 17B:
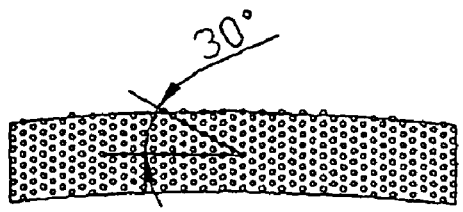
Figure 17C:
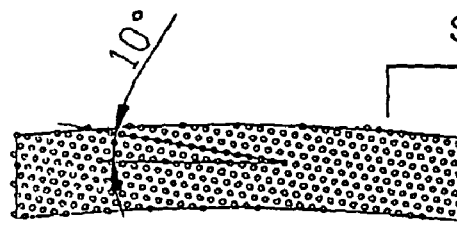
Figure 17D:
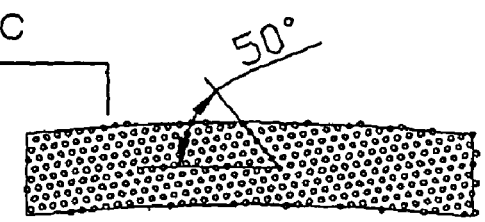
Figure 17E:
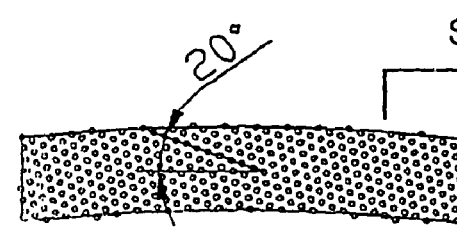
Figure 17F:
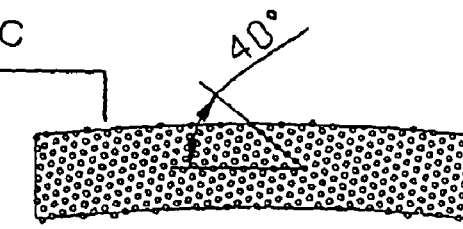

That is, FIG. 16A is symmetric to FIG. 16B, and FIG. 16C is symmetric to FIG. 16D.

Where regular triangle and isosceles triangle shown in FIGS. 11B and 11C are respectively taken as the basic units, the diamond particles are symmetrically arrayed respectively in reference to angles of inclination of 30 and 90 degs.

FIGS. 17A to 17F and FIGS. 18A to 18F show arrayed and symmetrized positions of diamond particles according to inclination angles where regular triangle and isosceles triangle are taken as basic units.

Where the diamond particles have an x-axial narrow inter-particle distance and an almost same height as in FIG. 12, the cutting operation partially exposes a region in the cutting surface where the diamond particles have an x-axial narrow inter-particle distance. Then, the effect of shoveling may not occur for 100% and thus excellent cutting rate cannot be expected.

Figure 19:
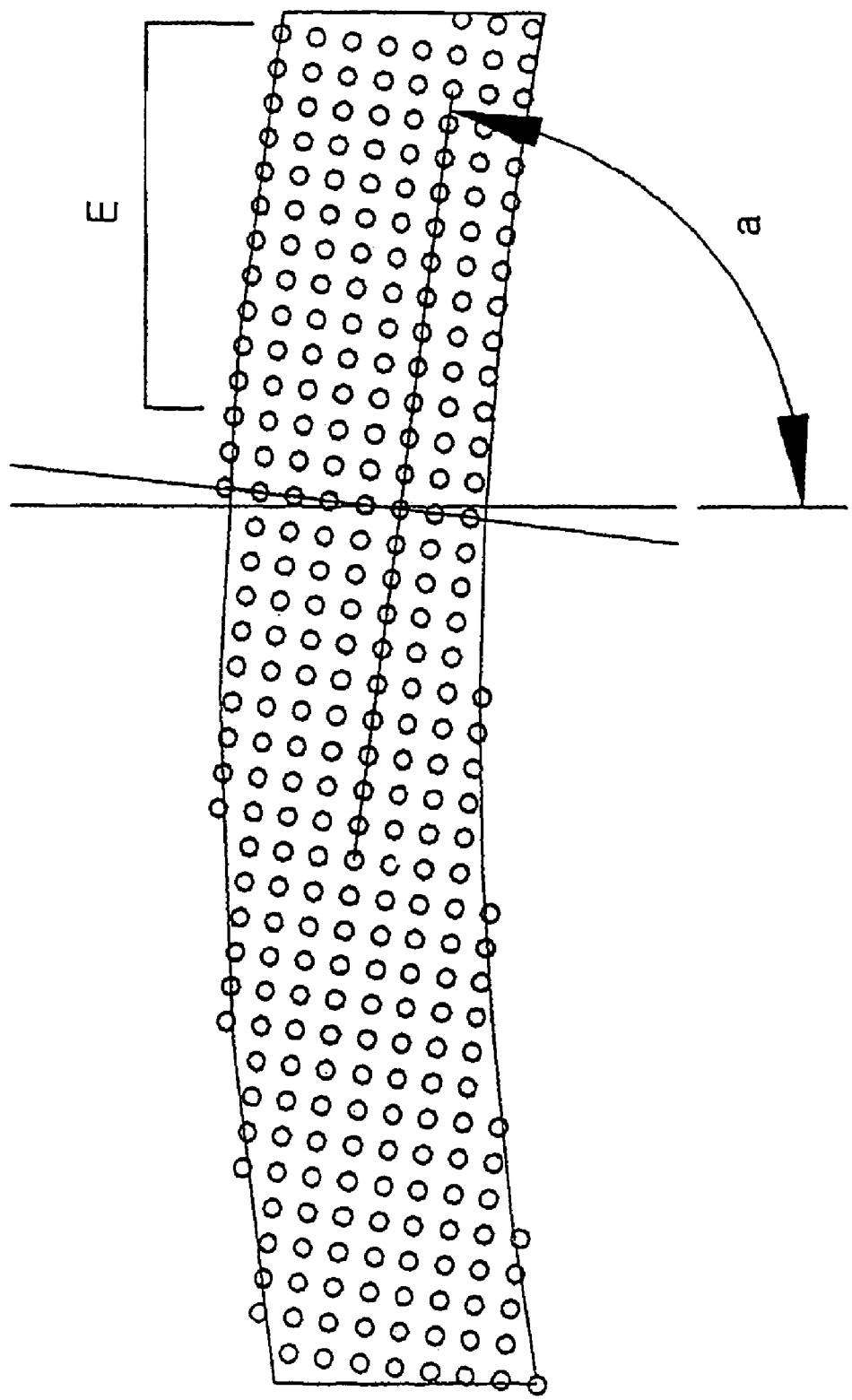
FIG. 19 schematically illustrates a cutting tip having a small value of inclination angle at which diamond particles are linearly arrayed so that the diamond particles are densely arrayed in a cutting surface at an end of the cutting tip.

Because an actual cutting surface of a cutting tip has a definite radius, if diamond particles are arrayed on a straight line, the diamond particles can be densely arrayed in a distal section of the cutting surface in the cutting tip at a certain degree of inclination as a limited region E in FIG. 19.

Figure 20:
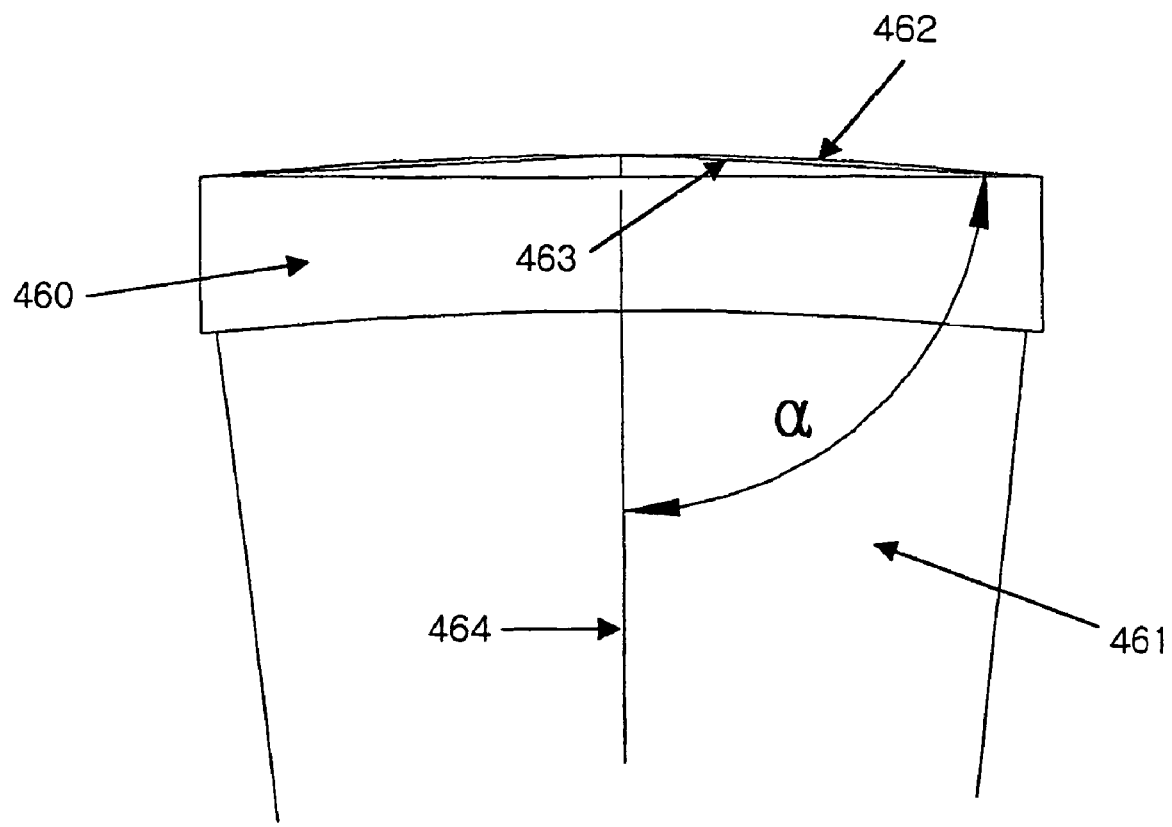
FIG. 20 schematically illustrates a portion of a diamond tool in which its steel core is coupled with a cutting tip.

FIG. 20 shows a portion of a diamond tool in which a cutting tip is attached to a steel core.

In FIG. 20, a straight line 463 is drawn from the center of a cutting surface 462 of a cutting tip 460 to a periphery of the cutting tip 460, and a straight line 464 is drawn from the center of the cutting surface 462 to the center of the steel core 461. The straight line 463 defines an angle α from the straight line 464, wherein it is supposed that the straight line 463 is in the cutting surface 462.

Figure 21:
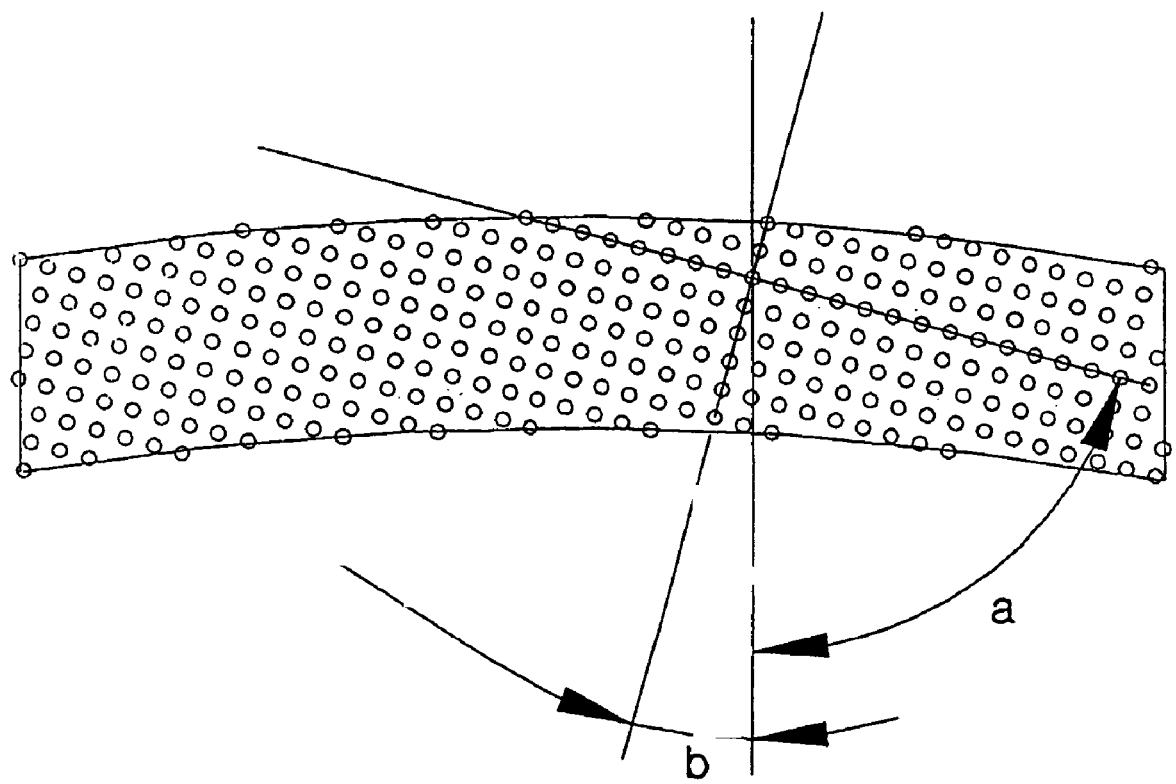
FIG. 21 schematically illustrates a cutting tip in which array angles a and b of diamond particles are defined.

Since diamond particles which actually take part in the cutting operation are across the cutting surface 462, it is preferable that the angle α is not equal to an angle a or b which is defined as in FIG. 21.

That is, when the diamond particles are arrayed, the inclination angle is preferably set in a range that α is not equal to a or b because the angle α can be varied according to the outer diameter dimension of the steel core 461 and the length of the cutting tip 460.

Where the angle α is equal to a or b as shown in FIG. 19, the inter-particle distance is narrowed in the cutting surface and thus the diamond particles are projected only in the limited region E. As a result, the effect of shoveling cannot be obtained for 100%.

Figure 22:
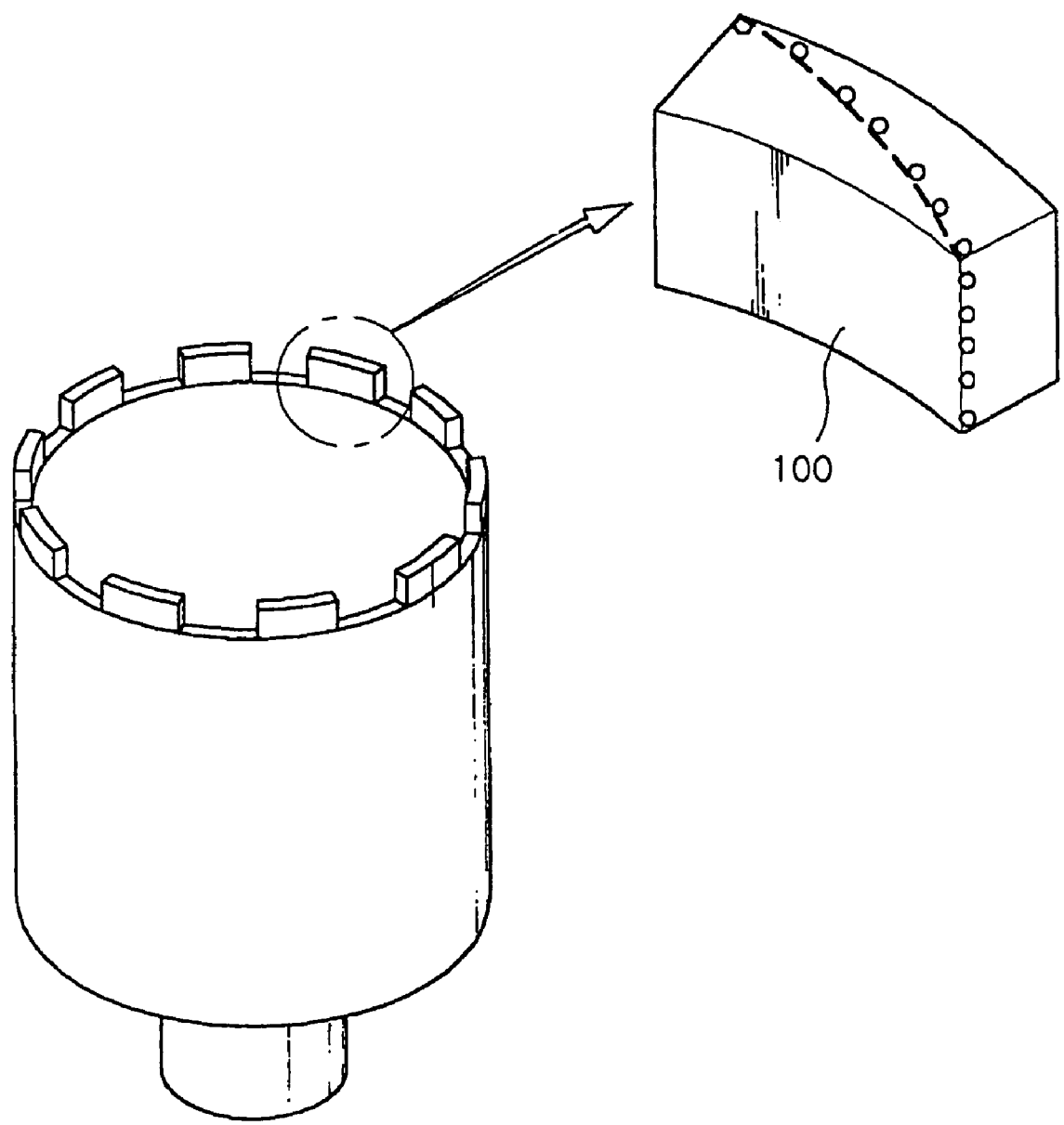
FIG. 22 is a perspective view of a core drill tip according to the invention.

Further, the invention can be applied to a cutting tip in a core bit which includes a number of cutting tips as shown in FIG. 22.

FIG. 22 shows an exemplary cutting tip in a core bit of the invention. As shown in FIG. 22, the cutting tip 100 has a number of diamond particles which are arrayed, in an overlapped fashion, on a slope in a cutting surface according to the invention.

Where the cutting tip is fabricated by arraying the diamond particles according to the invention, the diamond particles do not exist in outer lateral portions of the cutting tip. Then, metal powder may be prematurely abraded to potentially drop the uniformly arrayed diamond particles.

In order to prevent premature abrasion of the lateral portions of the cutting tip, it is preferable that high wear-resistant filler is distributed properly in a region of the lateral portions of the cutting tip where the diamond particles do not exist.

That is, in order to further prolong the lifetime of the tool of the invention, filler (high hardness abrasive) is added into metal powder to increase the wear resistance of metal powder. Available materials for filler may include wear-resistant particles such as SiC, WC, BN, $Al_2O_3$, diamond and composites thereof.

Where diamond is selected as filler, the concentration of diamond particles applied to the lateral portions is lower than that of cutting diamond particles filled in a central portion of the cutting tip since filler is added only to prevent abrasion of the lateral portions.

Preferably, the concentration of the filler diamond particles added in the lateral portions is about 10 to 50% of that of the cutting diamond particles in the central portion of the cutting tip.

If the concentration of the filler diamond particles in the lateral portions is under 10% of that of the cutting diamond particles in the central portion, the effect of preventing premature abrasion of the lateral portions is unexpectable owing to rapid abrasion of the lateral portions. On the other hand, if the concentration of the filler diamond particles is over 50% of that of the cutting diamond particles, the ability of preventing premature abrasion of the lateral portions is saturated while the quantity of the diamond particles in the central portion is relatively reduced thereby decreasing the cutting rate of the cutting tip.

Figure 23:
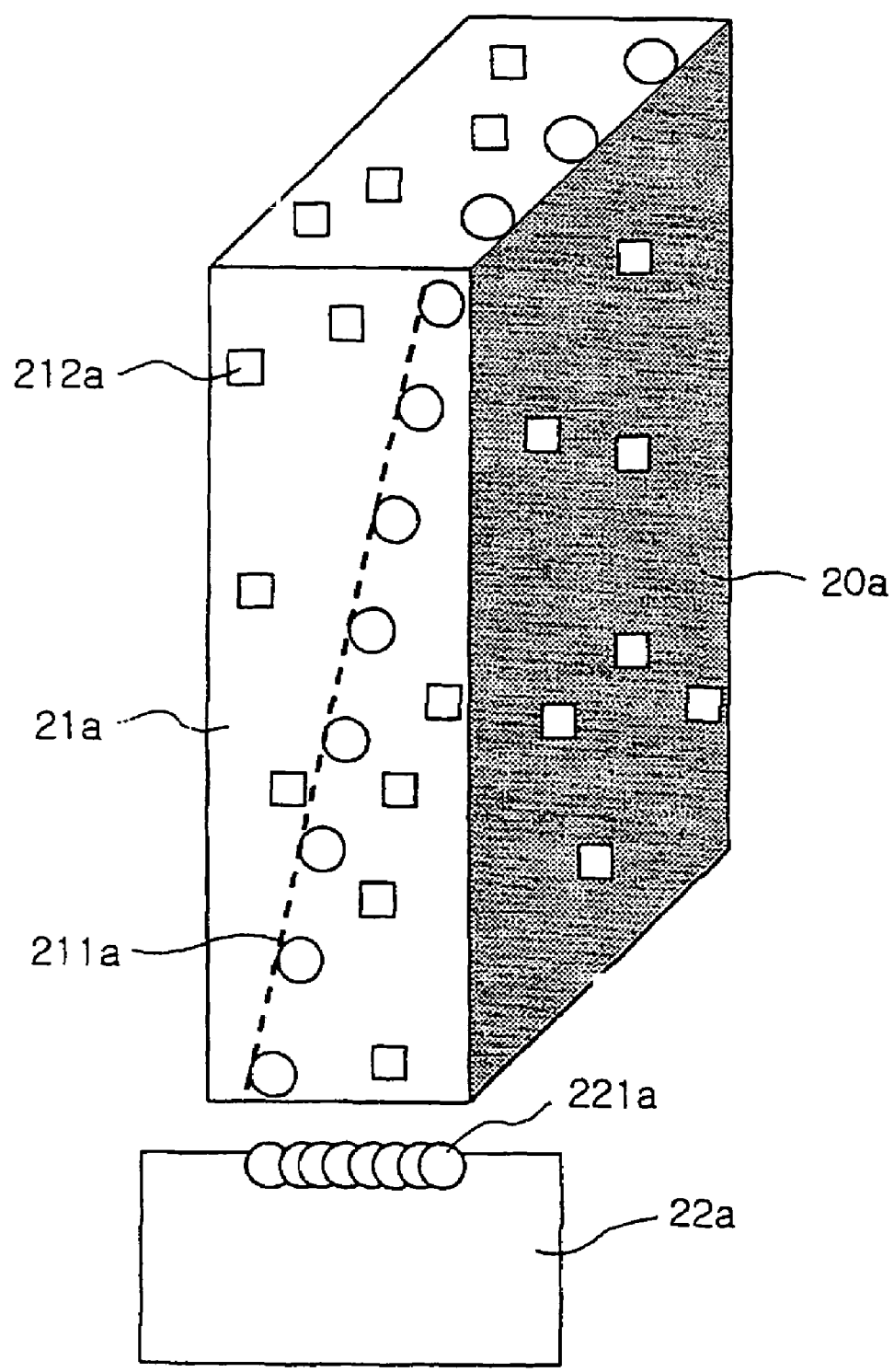
FIG. 23 schematically illustrates a cutting tip for a diamond tool in which filler is randomly distributed in a lateral portion of the cutting tip and a brittle substance having channels grooved by the cutting tip according to another alternative embodiment of the invention.
Figure 24:
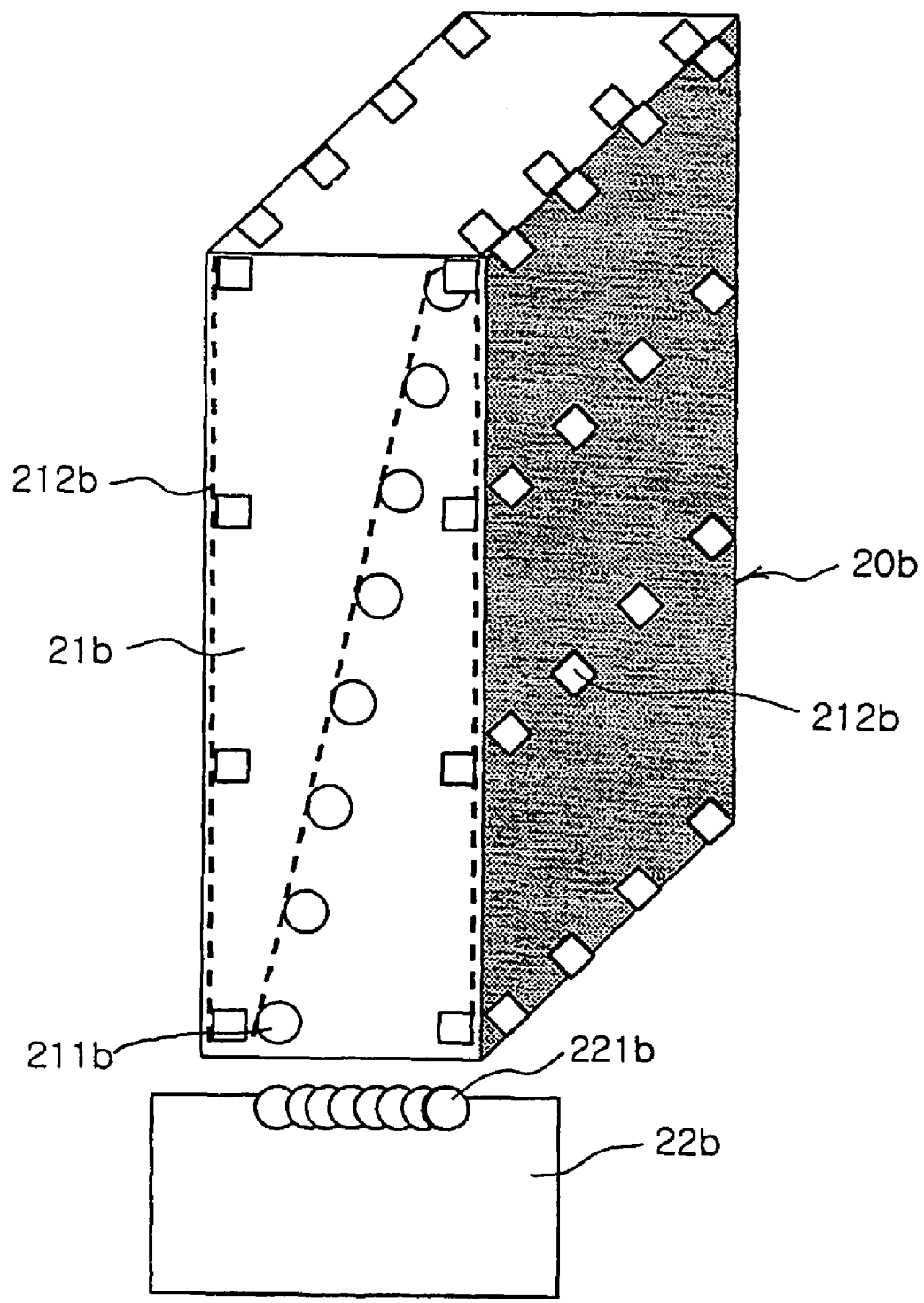
FIG. 24 schematically illustrates a cutting tip for a diamond tool in which filler is regularly distributed in a lateral portion of the cutting tip and a brittle substance having channels grooved by the cutting tip according to another alternative embodiment the invention.

As shown in FIG. 23, filler 212a can be randomly distributed in lateral portions of a cutting tip 20a. Alternatively, filler 212b can be regularly distributed in lateral portions of a cutting tip 20b as shown in FIG. 24.

In FIG. 23, the reference number 21a designates a cutting surface, 221a designates diamond particles, 22a designates a brittle substance, and 221a designates a grooved channel. In FIG. 24, the reference number 21b designates a cutting surface, 211b designates diamond particles, 22b designates a brittle substance, and 221b designates a grooved channel.

Hereinafter description will disclose a diamond tool fabrication method of the invention.

After a metal net is cut into the shape of a cutting tip, adhesive is sprayed over the metal net. A metal jig which is uniformly perforated with a laser is placed over the metal net and then coated with adhesive. Fine diamond particles are scattered over the metal jig so that each diamond particle is inserted into each hole of the metal jig. The metal jig is removed to obtain the metal net having the diamond particles uniformly arrayed thereon. Then, the metal net is cold-formed and sintered together with metal powder to fabricate a cutting tip.

The above-mentioned process of fabricating a diamond tool is an example, but is not to be construed as the limit of the present invention.

EXAMPLES

Hereinafter the invention will be described in more detail referring to various examples.

First Example

Diamond particles were laminated on a plane perpendicular to a cutting surface in such a manner that the diamond particles be inclined in the cutting surface. In this manner, 14 inch saws having 19 cutting tips were fabricated.

A cutting test was performed with the saws, and results thereof are reported in Table 1 to compare cutting rates according to array angles (b in FIG. 21).

In the above saws, each cutting tip had a length 50.8 mm, a height 8.2 mm and a thickness 3.2 mm, and metal powder had Co—Fe—Ni based component.

Diamond was MBS 955 available from GE in the United States, and its concentration was 0.8 cts/cc. Hot press sintering was performed at a sintering temperature of 860° C. for 5 minutes.

Cutting tips (segments) fabricated according to the above process were attached to 14 inch steel cores via laser welding, and a concrete cutting test was performed to a depth of 35 mm.

A testing machine was a 5.5 HP engine-driving type testing machine available from EDCO.

The diamond particles were arrayed according to inclination angles (b in FIG. 21) including 0, 5, 15, 25, 35 and 45 degs.

In each of the cutting tips, pairs of diamond particles were arrayed on a diagonal in a cutting surface of the cutting tip as shown in FIG. 6.

Diamond particles were applied as filler to lateral portions of the cutting tip in order to prevent abrasion thereof. These diamond particles were equal to those arrayed on a slope, and the concentration of filler diamond particles was about 45% of that of the cutting diamond particles on the slope.

2 has an inclination angle (b in FIG. 21) substantially equal to 90-α, and thus fails to show excellent cutting rate.

Second Example

Several types of saw blades were fabricated: A first saw blade had cutting tips attached thereto, which were prepared by arraying diamond particles as in FIG. 3 (inventive example 8). A second saw blade had cutting tips attached thereto, which were prepared by increasing the gradient of diamond particles as in FIG. 5 (inventive example 9). A third saw blade had cutting tips attached thereto, which were prepared by arraying pairs of diamond particles on a line as in FIG. 6 (inventive example 10). A conventional saw blade had cutting tips attached thereto, which were prepared by randomly distributing diamond particles instead of uniformly arraying the same (comparative example 1). A cutting test was performed to the above saw blades to inspect their cutting and wear performances, and results thereof are reported in Table 2.

The diamond particles were arrayed at an inclination angle of 25 deg based upon the results in First Example.

Used metal powder was Co—Ni—Fe based alloy, diamond was MBS 955 available from GE in the United States, and hot press sintering was performed at a sintering temperature of 860° for 5 minutes.

TABLE 1

| No. | Angle of Diamond Array | Concentration (cts/cc) | Cutting rate (cm²/min) | Cutting rate Ratio (%) | Wear performance Index (m²/mm) | Wear performance Ratio (%) |
|---|---|---|---|---|---|---|
| Inventive Ex. 1 | 0° | 0.8 | 560.3 | 105 | 4.295 | 101 |
| Inventive Ex. 2 | 5° | 0.8 | 554.5 | 104 | 4.380 | 103 |
| Inventive Ex. 4 | 15° | 0.8 | 587.1 | 110 | 4.635 | 109 |
| Inventive Ex. 5 | 25° | 0.8 | 657.5 | 123 | 4.592 | 108 |
| Inventive Ex. 6 | 35° | 0.8 | 624.1 | 117 | 4.507 | 106 |
| Inventive Ex. 7 | 45° | 0.8 | 621.8 | 117 | 4.805 | 113 |
| Comp. Ex. 1 | Random | 0.8 | 532.7 | 100 | 4.252 | 100 |

As shown in Table 1, it can be seen that cutting rate and wear performance indices of inventive examples 1 to 7 are more excellent than those of comparative example 1. In particular, the cutting rate is most excellent in inventive examples 5 and 6 having inclination angles of 25 to 45 degs.

It can be seen that inventive examples 1 and 2 have rather lower indices compared with those of inventive examples 4 to 7 because diamond particles are crowded in some regions instead of being uniformly projected from cutting surfaces in inventive examples 1 and 2. In particular, inventive example Tools in Second Example were fabricated by attaching 19 cutting tips, respectively, to 14 inch steel cores via laser welding, and a concrete cutting test was performed to a depth of 35 mm.

A testing machine was an engine-driving type testing machine available from EDCO, and had 3,700 rpm when idled.

Each cutting tip had a length 50.8 mm, a height 8.2 mm and a thickness 3.2 mm.

TABLE 2

| No. | Array | Concentration (cts/cc) | Cutting rate (cm²/min) | Cutting Ratio (%) | Wear performance (m²/mm) | Wear performance Ratio (%) |
|---|---|---|---|---|---|---|
| Inventive Ex. 8 | Inclined | 0.8 | 657.5 | 123 | 4.592 | 108 |
| Inventive Ex. 9 | Inclined | 0.8 | 724.8 | 136 | 5.123 | 120 |
| Inventive Ex. 10 | Inclined | 0.8 | 747.8 | 140 | 5.280 | 124 |
| Comp. Ex. 1 | Random | 0.8 | 532.7 | 100 | 4.252 | 100 |

As can be seen in Table 2, the three saw blades of inventive examples with the diamond particles arrayed on slopes showed more excellent performances in comparison with the conventional saw in which the diamond particles are randomly distributed. In particular, inventive examples 9 and 10 have performances more excellent than that of inventive example 8 because the gradient was raised in inventive example 9 and the diamond particles were arrayed in pairs on the slope in inventive example 10. It is considered, as a result, grooved channels on brittle substances formed by the diamond particles were increased in degree of overlapping, thereby maximizing the effect of shoveling in inventive examples 9 and 10.

Third Example

In order to inspect the relation between the cutting rate and the number and condition of diamond particles arrayed on a slope in a cutting surface, the diamond particles in the saw blades were observed during the cutting test in Second Example. The diamond particles were inspected for total three times including inspection on their initial conditions and two inspections after 100 and 200 cutting cycles on brittle substances, and results thereof are reported in Table 3. (The cutting cycle is an operation wherein the diamond tool completely cuts a brittle substance having a length of 30 cm once with a constant depth.)

TABLE 3

| No. | Cut Lines | Inclined Portion | | | | Filler Portion | | | |
| --- | --- | --- | --- | --- | --- | --- | --- | --- | --- |
| | | Whole Crystal | Fractured Crystal | Pull-out Crystal | Total | Whole Crystal | Fractured Crystal | Pull-out Crystal | Total |
| Inventive Ex. 8 | 0 | 15 | 11 | 4 | 30 | 21 | 16 | 5 | 42 |
| | 100 | 8 | 14 | 3 | 25 | 11 | 20 | 5 | 35 |
| | 200 | 8 | 15 | 7 | 30 | 12 | 21 | 10 | 43 |
| Inventive Ex. 9 | 0 | 10 | 8 | 5 | 23 | 15 | 12 | 6 | 33 |
| | 100 | 10 | 5 | 7 | 21 | 14 | 6 | 9 | 30 |
| | 200 | 8 | 10 | 9 | 26 | 11 | 13 | 13 | 37 |
| Inventive Ex. 10 | 0 | 19 | 2 | 2 | 23 | 9 | 1 | 1 | 11 |
| | 100 | 16 | 8 | 7 | 31 | 8 | 4 | 3 | 15 |
| | 200 | 11 | 16 | 11 | 37 | 5 | 8 | 5 | 19 |
| Inventive Ex. 1 | 0 | — | — | — | — | 37 | 8 | 4 | 49 |
| | 100 | — | — | — | — | 19 | 16 | 12 | 47 |
| | 200 | — | — | — | — | 25 | 8 | 28 | 61 |

As can be seen in Table 3, in inventive example 8, the number of whole and fractured crystals directly participating in cutting was 26, 22 and 23, respectively, at the initial stage and after 100 and 200 cutting cycles. In inventive example 9, the number of whole and fractured crystals was 18, 15 and 18, respectively, at the initial stage and after cutting 100 and 200 times. Although more crystals were found in inventive example 8 than in inventive example 9, it is apparent that the cutting rate of inventive example 8 is rather poorer than that of inventive example 9.

This result means that the effect of shoveling may not occur in some regions where the projected diamond particles were actually different in diameter and shape as well as inter-particle distances were various although the diamond particles theoretically overlap with each other in the slope of the cutting surface. On the contrary, although inventive example 9 had fewer diamond particles, the gradient of diamond array was increased in inventive example 9 and thus intensified the effect of shoveling. As a result, inventive example 9 apparently showed more excellent cutting rate than inventive example 8.

In the meantime, inventive example 10 has more whole and fractured crystals directly participating in cutting than inventive examples 8 and 9, which were 21, 24 and 27, respectively, at the initial stage and after 100 and 200 cutting cycles. Also, the overlapping degree of diamond particles of inventive example 10 was increased over those of inventive examples 8. As a result, inventive example 10 showed more excellent cutting rate than those of inventive examples 8 and 9.

Fourth Example

Figure 25:
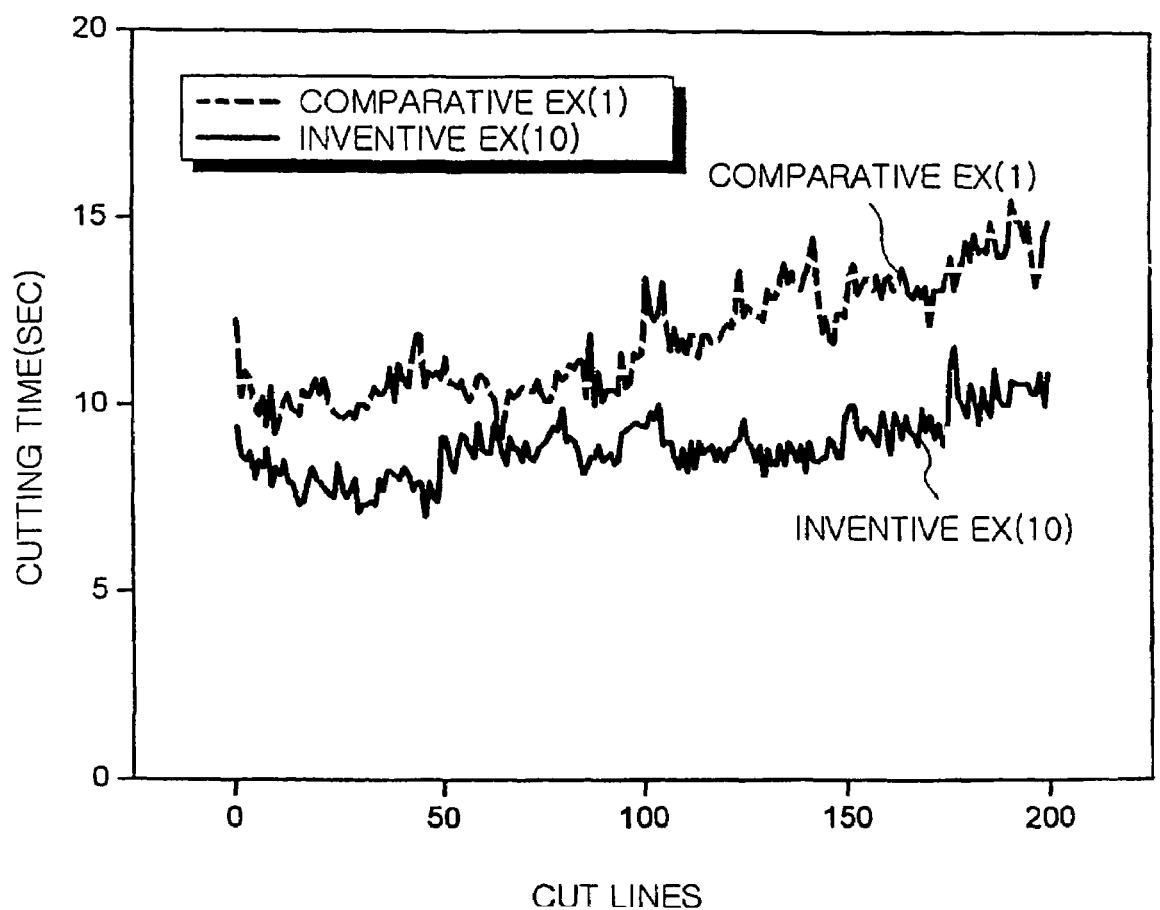
FIG. 25 is a graph illustrating variations of cutting time according to number of cutting times in comparative example 1 and inventive example 10.

The variation of cutting time (sec) as a function of the number of cutting cycle were inspected in the saw blades of inventive example 10 and the comparative example 1 in Second Example, and results of the inspection are reported in FIG. 25.

Herein, the cutting cycle means an operation wherein the diamond tool completely cuts a brittle substance having a length of 30 cm once with a constant depth.

As shown in FIG. 25, the saw blade of inventive example 10 has a shorter cutting time, more stable cutting time tendency and more uniform performance compared with those of comparative example 1.

Fifth Example

A cutting tip (segment) was fabricated based upon inventive example 9 in Second Example, in which filler was added into metal powder for preventing premature abrasion of a lateral portion of the cutting tip, and a cutting test was performed with the cutting tip.

Filler was diamond particles, which were equal to cutting diamond particles regularly arrayed on a slope, and the concentration thereof was variously 5 to 55% of that of the cutting diamond particles.

Premature abrasion of the cutting tip lateral portion was judged based upon thickness decrease of the cutting tip after cutting operation.

After cutting operations of 30 m and 60 m, the thickness decrease of the cutting tip was measured based upon the initial thickness of 3.2 mm. Measurements were obtained from 4 cutting tips angled for about 90 deg from a reference cutting tip among 19 cutting tips, and the mean value thereof was compared with the quantity of abrasion in the lateral portion. Other test conditions were equal to those of Second Example.

TABLE 4

| Sample No. | Filler Contents (%) | Thickness Decrease of Segment (mm) | | Result | Remark |
|---|---|---|---|---|---|
| | | 30 m Cutting | 60 m Cutting | | |
| 1 | 5 | 0.17 | 0.36 | Severe Abrasion | Comparative Ex. |
| 11 | 10 | 0.03 | 0.06 | Good | Inventive Ex. |
| 12 | 20 | 0.02 | 0.05 | Good | Inventive Ex. |
| 13 | 30 | 0.03 | 0.05 | Good | Inventive Ex. |
| 14 | 40 | 0.02 | 0.04 | Good | Inventive Ex. |
| 15 | 50 | 0.02 | 0.05 | Good | Inventive Ex. |
| 2 | 55 | 0.02 | 0.04 | Poor Cutting | Comparative Ex. |

As apparent from Table 4, a segment of comparative example 1 showed severe thickness decrease since its filler content is beyond the lower limit. Whereas, cutting tips of inventive examples 11 to 15 showed extremely low values of thickness decrease.

In comparative example 2 where its filler content was beyond the upper limit, a cutting tip showed poor cutting rate although it had a small quantity of thickness decrease.

Sixth Example

Advantages of a saw blade where diamond particles are regularly arrayed may include uniformity of an article as well as improvement of cutting performance. A cutting tip was prepared by arraying pairs of diamond particles on a slope as shown in FIG. 6 corresponding to inventive example 10 in Second Example, and plurality of this cutting tip were attached to a steel core to fabricate a saw blade. Five saw blades were fabricated in this fashion in order to have a confirmation test to these advantages.

Further, five conventional saw blades having randomly distributed diamond particles were fabricated by using equal metal powder and diamond at an equal concentration.

The diamond particles were arrayed at an inclination angle of 25 deg based upon the results in First Example, in which metal powder, diamond and sintering conditions were equal to those of Second Example.

In Sixth Example, each of tools was fabricated by attaching the cutting tips to a 14 inch steel core via laser welding. A concrete cutting test was performed to a depth of 35 mm. Cutting rates were calculated, and results thereof are shown in FIG. 26.

A testing machine was an engine-driving type testing machine available from EDCO, and had 3,700 rpm when idled.

Each cutting tip had a length 50.8 mm, a height 8.2 mm and a thickness 3.2 mm.

Figure 26:
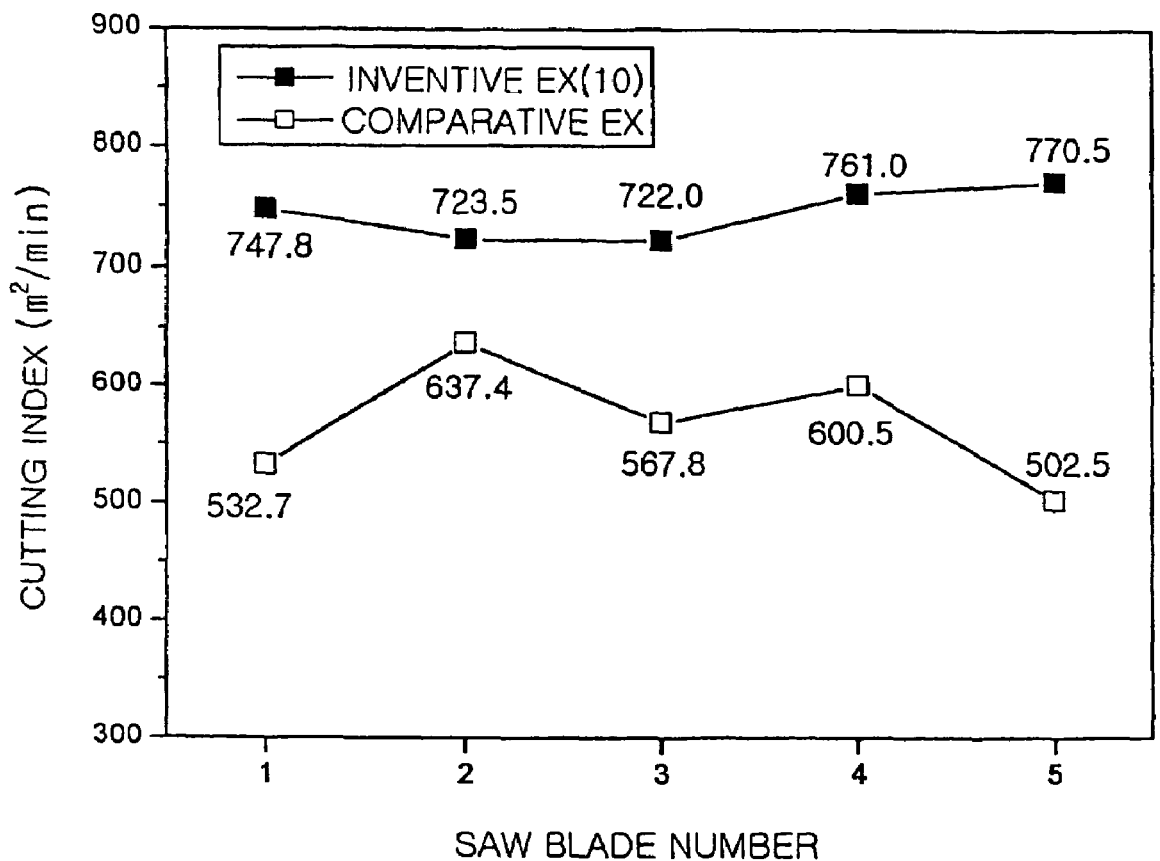
FIG. 26 is a graph illustrating variations of cutting rate between comparative example 1 and inventive example 10.

As shown in FIG. 26, cutting rates of inventive example 10 show a variation within ±4%. Whereas, cutting rates of comparative example show a variation within ±12%. As a result, inventive example 10 is more excellent than comparative example regarding the uniformity of articles.

As set forth above, the present invention provides a cutting tip for a diamond tool and a diamond tool having the same, in which diamond particles are arrayed on a slope inclined in respect to a cutting direction on a plane parallel to a cutting surface, by which grooved channels are successively formed in an overlapped fashion in a brittle substance in cutting operation. As a result, the invention can maximize the usefulness of every diamond particle in cutting operation, thereby improving the cutting rate of the cutting tip and the diamond tool.

Furthermore, the present invention array the diamond particles in laminated structures on slopes in the cutting surfaces and distribute suitable filler in proper positions, thereby improving the cutting rate of the cutting tip and the diamond tool as well as further prolonging their lifetimes.

The invention claimed is:

1. A cutting tip for a diamond tool comprising diamond particles for cutting that are adhered to the cutting tip by a sintered metal powder, wherein the diamond particles are arranged in a diagonal pattern on a cutting surface, and adjacent diamond particles overlap one another in a cutting direction, and wherein a filler is located on the cutting tip in areas that do not contact the diamond particles for cutting, the filler being at least one selected from a group including SiC, WC, BN, $Al_2O_3$ and diamond.

2. A cutting tip for a diamond tool as set forth in claim 1, wherein the filler is diamond, and the concentration of the diamond filler diamond is about 10 to 50% of that of the diamond particles for cutting.

3. A diamond tool having a cutting tip for a diamond tool as set forth in claim 2.

4. A diamond tool as set forth in claim 3, wherein the cutting tip comprises a number of cutting tips.

5. A diamond tool having a cutting tip for a diamond tool as set forth in claim 1.

6. A diamond tool as set forth in claim 5, wherein the cutting tip comprises a number of cutting tips.

* * * * *

UNITED STATES PATENT AND TRADEMARK OFFICE
CERTIFICATE OF CORRECTION

PATENT NO. : 7,337,775 B2  Page 1 of 1
APPLICATION NO. : 10/503799
DATED : March 4, 2008
INVENTOR(S) : Kim et al.

It is certified that error appears in the above-identified patent and that said Letters Patent is hereby corrected as shown below:

Title Page;
Face of Patent: See Item (73) Assignee, please add the second Assignee:
-- General Tool Inc., Irvine, California (USA) --

Signed and Sealed this

Twenty-first Day of October, 2008

JON W. DUDAS
*Director of the United States Patent and Trademark Office*